US010015703B2

(12) United States Patent
Futaki et al.

(10) Patent No.: US 10,015,703 B2
(45) Date of Patent: Jul. 3, 2018

(54) RADIO COMMUNICATION SYSTEM, RADIO STATION, NETWORK OPERATION MANAGEMENT APPARATUS, AND NETWORK OPTIMIZATION METHOD

(71) Applicant: NEC Corporation, Tokyo (JP)

(72) Inventors: Hisashi Futaki, Tokyo (JP); Kosei Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 23 days.

(21) Appl. No.: 14/385,382

(22) PCT Filed: Mar. 15, 2013

(86) PCT No.: PCT/JP2013/001756
§ 371 (c)(1),
(2) Date: Sep. 15, 2014

(87) PCT Pub. No.: WO2013/136811
PCT Pub. Date: Sep. 19, 2013

(65) Prior Publication Data
US 2015/0078344 A1    Mar. 19, 2015

(30) Foreign Application Priority Data
Mar. 15, 2012    (JP) ................................ 2012-058626

(51) Int. Cl.
*H04W 36/00* (2009.01)
*H04W 24/02* (2009.01)
*H04W 24/10* (2009.01)

(52) U.S. Cl.
CPC ....... *H04W 36/0083* (2013.01); *H04W 24/02* (2013.01); *H04W 24/10* (2013.01)

(58) Field of Classification Search
None
See application file for complete search history.

(56) References Cited

U.S. PATENT DOCUMENTS

2008/0233967 A1   9/2008  Montojo et al.
2010/0325267 A1   12/2010 Mishra et al.
(Continued)

FOREIGN PATENT DOCUMENTS

EP    2107838       *  4/2008
EP    2 410 781 A1     1/2012
(Continued)

OTHER PUBLICATIONS

3GPP TR 36.902 V9.3.0, (Internet <URL> http:www.3gpp.org/ftp/Specs/html-info/36902.htm), Dec. 2010.
(Continued)

*Primary Examiner* — Mohammad S Adhami
(74) *Attorney, Agent, or Firm* — Finnegan, Henderson, Farabow, Garrett & Dunner, L.L.P.

(57) ABSTRACT

A radio communication system, a radio station, a network operation management apparatus, and a network optimization method are provided that make it possible to avoid performance degradation in the entire system when network optimization is performed individually. In the radio communication system in which radio stations perform network optimization based on statistical communication quality in at least one cell, a radio station (10) notifies information related to a change in statistical communication quality in a cell under the radio station (10) to another radio station (20) or a network apparatus (30) managing the another radio station.

34 Claims, 18 Drawing Sheets

(56) References Cited

U.S. PATENT DOCUMENTS

| | | | |
|---|---|---|---|
| 2011/0116480 A1 | 5/2011 | Li et al. | |
| 2012/0120887 A1* | 5/2012 | Deaton | H04W 16/14 370/329 |
| 2013/0117842 A1* | 5/2013 | Kakadia | H04W 24/00 726/22 |
| 2014/0113676 A1* | 4/2014 | Hamalainen | H04W 72/046 455/522 |
| 2015/0085681 A1* | 3/2015 | Bowdery | H04W 24/02 370/252 |

FOREIGN PATENT DOCUMENTS

| | | |
|---|---|---|
| EP | 2 426 978 A1 | 3/2012 |
| EP | 2 429 228 A1 | 3/2012 |
| JP | 2010-187075 | 8/2010 |
| JP | 2012-531167 | 12/2012 |
| JP | 2013-511195 | 3/2013 |
| WO | WO 2010/129933 A1 | 11/2010 |
| WO | WO 2011/005524 A2 | 1/2011 |
| WO | WO 2011-059267 | 5/2011 |
| WO | WO 2011/059267 A2 | 5/2011 |

OTHER PUBLICATIONS

3GPP TS 36.300 V10.5.0, (Internet <URL> http:www.3gpp.org/ftp/Specs/html-info/36300.htm), Sep. 2011.

3GPP TS 37.320 V10.4.0, (Internet <URL> http:www.3gpp.org/ftp/Specs/html-info/37302.htm), Dec. 2011.

3GPP TS 36.300 V10.6.0, $3^{rd}$ Generation Partnership Project, Technical Specification Group Radio Access Network, Evolved Universal Terrestrial Radio Access (E-UTRA) and Evolved Universal Terrestrial Radio Access Network (E-UTRAN), Overall description, Stage 2, Release 10, pp. 169-170, Dec. 2011.

Son Full Multi-Vendor Support—NMS-eNB direct interface proposals, 3GPP TSG-SA5 (Telecom Management), S5-080748, Meeting SA5#59, Apr. 2008.

International Search Report and Written Opinion dated Apr. 16, 2013 in corresponding PCT International Application.

ZTE, "Solution for Coverage and Capacity optimization", 3GPP TSG RAN WG3 Meeting #59bis, R3-080703, Mar.-Apr. 2008.

Extended European Search Report dated Dec. 21, 2015 by the European Patent Office in counterpart European Patent Application No. 13761808.8.

Decision to Grant Patent dated Oct. 25, 2017, by the Japanese Patent Office in counterpart Japanese Patent Application No. 2014-504714.

* cited by examiner

FIRST EXAMPLE

SECOND EXAMPLE

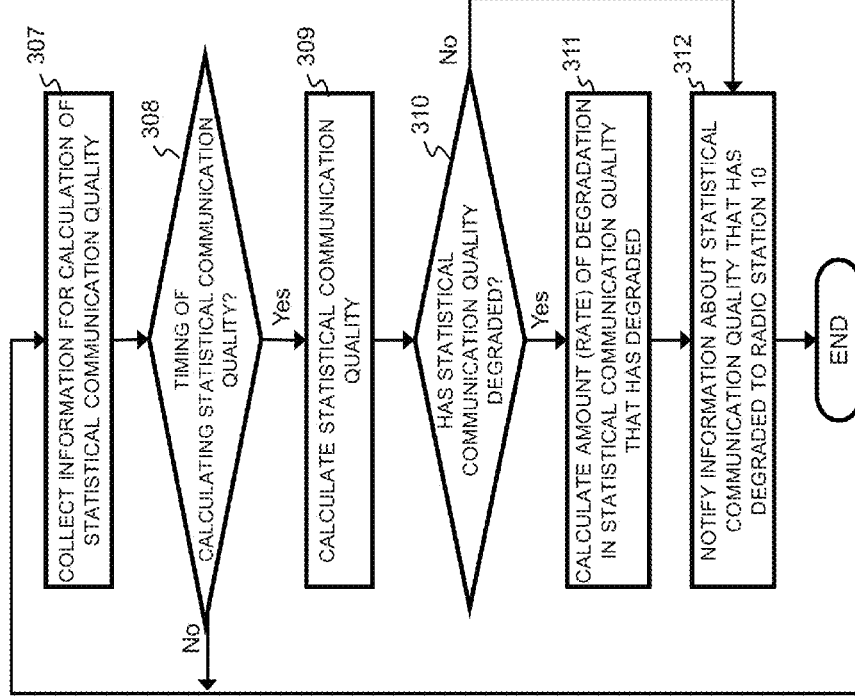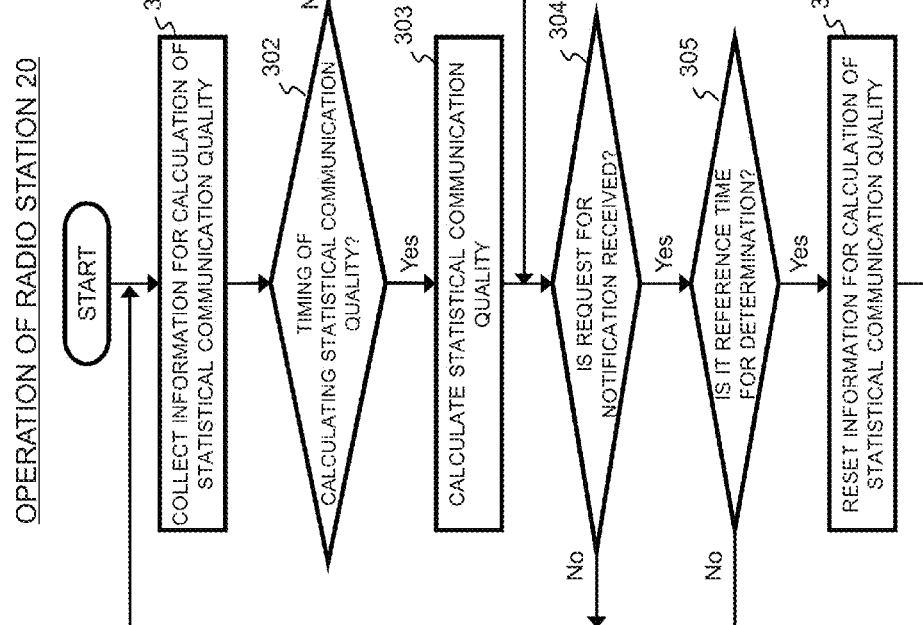
FIG. 10
THIRD EXAMPLE

FOURTH EXAMPLE

MODIFICATION EXAMPLE OF FOURTH EXAMPLE

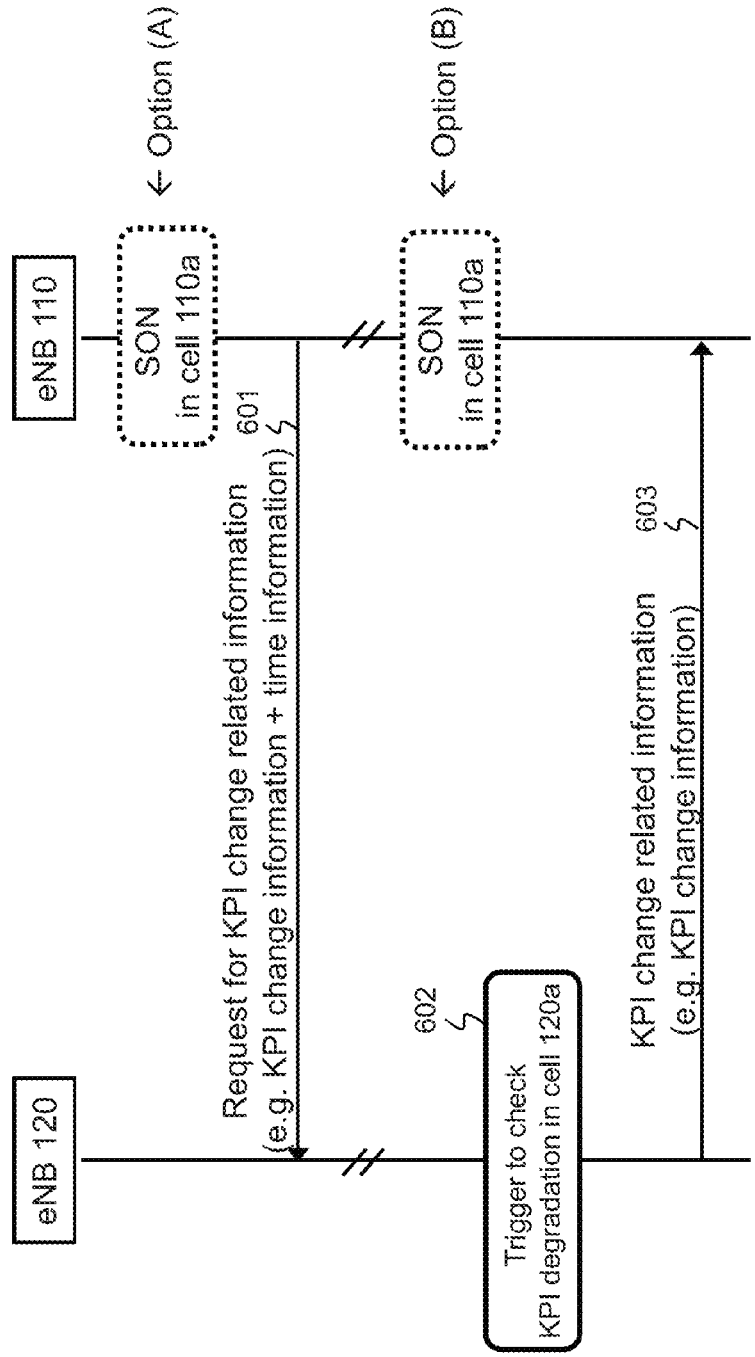

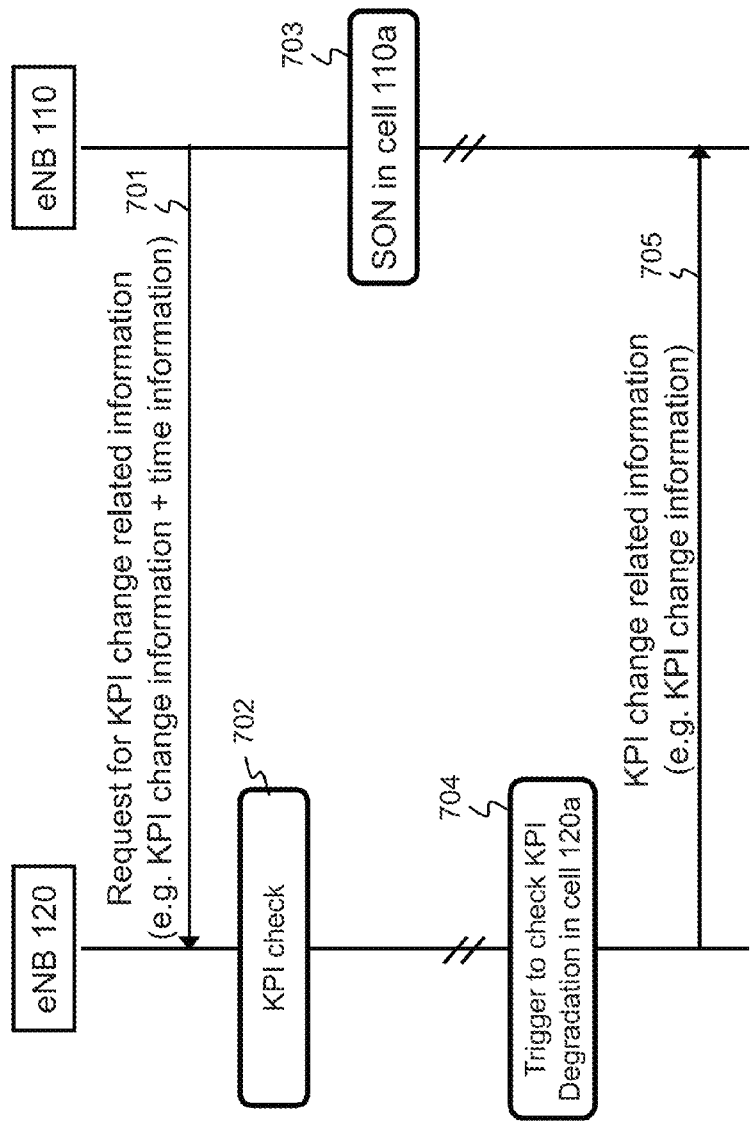

RADIO COMMUNICATION SYSTEM, RADIO STATION, NETWORK OPERATION MANAGEMENT APPARATUS, AND NETWORK OPTIMIZATION METHOD

CROSS-REFERENCE TO RELATED PATENT APPLICATIONS

This application is a National Stage Entry of International Application No. PCT/JP2013/001756, filed Mar. 15, 2013, which claims priority from Japanese Patent Application No. 2012-058626, filed Mar. 15, 2012. The entire contents of the above-referenced applications are expressly incorporated herein by reference.

TECHNICAL FIELD

The present invention relates to a radio communication system and, more particularly, to a radio station, a network operation management apparatus and a radio communication system that have a function of performing network optimization, as well as to a network optimization method.

BACKGROUND ART

In recent years, active discussions have been conducted about SON (Self Organizing Network), which autonomously optimizes radio parameters and/or network configuration in a radio communication system such as a cellular system, in the light of operation cost (OPEX) reduction. The standardization of SON functions is also under way in 3GPP LTE (Long Term Evolution) (NPL 1).

SON has functions such as the following:
Self-Configuration;
Self-Optimization; and
Self-Healing.
These are techniques for achieving respective different purposes. For example, purposes of self-optimization include: optimization of cell coverage and capacity (Coverage and Capacity Optimization (CCO)); optimization of a handover parameter (also referred to as a mobility parameter) (Mobility Robustness Optimization (MRO)); optimization of load balancing (Mobility Load Balancing (MLB)); and the like (NPL 2).

Hereinafter, a brief description of SON operation will be given by using the MRO and CCO functions as an example in a 3GPP LTE radio communication system as shown in FIGS. 1 and 2. Note that macro radio base station (macro eNB) will be abbreviated to MeNB.

Referring to FIG. 1, in a radio communication system in which MeNBs 1, 2 and 3 exist, which manage cells 1, 2 and 3, respectively, it is assumed that the MeNBs 1 and 2 are provided by a vender A while the MeNB 3 is provided by a vender B, and that the MeNBs 1 and 2 are managed by a SON server A of the vender A while the MeNB 3 is managed by a SON server B of the vender B. In this system, the SON server A can recognize or detect what effect is caused on the cell 2 when the MRO function is executed in the cell 1. Moreover, the SON server A notifies the MeNB 2 of information about this effect, whereby the MeNB 2 can also recognize that the effect is caused by the MeNB 1 executing MRO in the cell 1. For example, when an effect that causes some problem in the cell 2 (e.g., KPI (Key Performance Indicator) degradation) is recognized or detected, the SON server A or MeNB 1 can mitigate such KPI degradation by reassessing the optimization of a handover-related parameter in the cell 1. Here, for reassessing the optimization, conceivable actions include: restoring the previous state; readjusting the optimized handover-related parameter toward the previous state; and the like. On the other hand, when KPI degradation is detected or recognized in the cell 3, the SON server B or MeNB 3 performs optimization for the cell 3 (e.g., optimization of a handover-related parameter).

Next, a heterogeneous network (HetNet) as shown in FIG. 2 is assumed. In this HetNet environment, it is assumed that MeNBs 1 and 2, which manage cells 1 and 2, respectively, are managed by a SON server A as in FIG. 1, while a pico eNB (PeNB) 4, which manages a pico cell 4, is managed by a SON server B of a vender B. In such a HetNet environment, the SON server A can recognize or detect what effect is caused on the cell 2 when the CCO function is executed and the transmit power is thus optimized in the cell 1. When an effect that causes some problem in the cell 2 (e.g., KPI degradation) is recognized or detected, the SON server A or MeNB 1 can suppress the KPI degradation in the cell 2 by reassessing the optimization of the transmit power in the cell 1, similarly to the above. On the other hand, when KPI degradation is detected or detected in the pico cell 4, the SON server B or PeNB 4 performs optimization for the pico cell 4 (e.g., optimization of transmit power).

CITATION LIST

Patent Literature

[NPL 1]
3GPP TS36.300 v10.5.0, Section 22 (Internet <URL> http://www.3gpp.org/ftp/Specs/html-info/36300.htm)
[NPL 2]
3GPP TR36.902 v9.3.0 (Internet <URL> http://www.3gpp.org/ftp/Specs/html-info/36902.htm)
[NPL 3]
3GPP TR37.320 v10.4.0 (Internet <URL> http://www.3gpp.org/ftp/Specs/html-info/37302.htm)

SUMMARY OF INVENTION

Technical Problem

However, the execution of various optimization algorithms and the determination of parameters as described above are performed by each radio base station or a SON server managing the radio base station. In this event, network optimization is performed at a cell or a radio base station managed by a SON server, which does not consider how cells or radio base stations outside its management are affected. Consequently, although individual optimization control is performed in each of partial networks in the system, there is nevertheless a possibility that performance of the entire system degrades.

In the case of the above-described system shown in FIG. 1, even if the optimization of a handover-related parameter in the cell 1 causes KPI degradation in the cell 3 of the MeNB 3, such as, for example, degradation in performance of handover from the cell 3 to the cell 1 or an increased incidence of call disconnection (Radio Link Failure: RLF) in the cell 3, the MeNB 1 or SON server A cannot detect such KPI degradation in the cell 3. Accordingly, even when the MeNB 1 or SON server A performs optimization control to resolve KPI degradation in the cells 1 and 2, they do not perform such control as to resolve KPI degradation in the cell 3. Consequently, there is a possibility of degrading performance of the entire system composed of the cells 1 to 3 (and other neighbour cells) degrades.

Similarly, in the case of the system shown in FIG. 2, when the PeNB 4 or SON server B detects KPI degradation in the pico cell 4, such as, for example, an increased incidence of call disconnection RLF or a decline in the average user throughput (or in the bottom 5% of user throughput in a cumulative distribution function (CDF)), then the PeNB 4 or SON server B executes a SON function (here, the CCO function) to resolve such performance degradation even if it is attributable to a problem in the cell 1, which should be resolved primarily by the MeNB 1 or SON server A. As described above, the individual execution of SON functions in parts of the system may result in performance degradation in the entire system.

Accordingly, an object of the present invention is to provide a radio communication system, a radio station, a network operation management apparatus, and a network optimization method that enable network optimization while suppressing performance degradation in the entire system when multiple radio base stations and upper-level network apparatuses individually perform network optimization.

Solution to Problem

A radio communication system according to the present invention is a radio communication system in which radio stations perform network optimization based on statistical communication quality in at least one cell, characterized in that a first radio station notifies information related to a change in statistical communication quality in a first cell of the first radio station to a second radio station or a network apparatus managing the second radio station.

A network optimization method according to the present invention is a network optimization method in a radio communication system in which radio stations perform network optimization based on statistical communication quality in at least one cell, characterized in that a first radio station notifies information related to a change in statistical communication quality in a first cell of the first radio station to a second radio station or a network apparatus managing the second radio station.

A radio station according to the present invention is a radio station in a radio communication system in which radio stations perform network optimization based on statistical communication quality in at least one cell, characterized by comprising: a calculation means for calculating information related to a change in statistical communication quality in a cell under the radio station; and a communication control means for notifying the information related to a change in statistical communication quality to another radio station or a network apparatus managing the another radio station.

A radio station according to the present invention is a radio station in a radio communication system in which radio stations perform network optimization based on statistical communication quality in at least one cell, characterized by comprising: a reception means for receiving information related to a change in statistical communication quality in a cell under another radio station, from the another radio station or a network apparatus managing the another radio station; and an optimization control means for controlling network optimization in a cell under the radio station.

A network operation management apparatus according to the present invention is a network operation management apparatus which manages a network including a radio station that performs network optimization based on statistical communication quality in at least one cell, characterized by comprising: a reception means for receiving information related to a change in statistical communication quality in a cell under another radio station, from the another radio station or a network apparatus managing the another radio station; and an optimization control means for controlling optimization of the network managed by the network operation management apparatus.

Advantageous Effects of Invention

According to the present invention, it is possible to avoid performance degradation in an entire system when network optimization is performed individually.

BRIEF DESCRIPTION OF DRAWINGS

FIG. 10 is a flowchart showing operations of a radio station according to a third example of the present invention.

FIG. 17 is a sequence diagram showing operations in a radio communication system according to a sixth example of the present invention.

FIG. 18 is a sequence diagram showing operations in a radio communication system according to a modification example of the sixth example of the present invention.

DESCRIPTION OF EMBODIMENTS

According to exemplary embodiments of the present invention, a radio station in a radio communication system in which network optimization is autonomously performed notifies another radio station or a upper-level network apparatus managing such another radio station of information about changes in statistical communication quality in a cell of this radio station. This allows the another radio station or upper-level network apparatus to recognize the state of the radio station, for example, the radio status in the cell of the radio station. Thus, it is possible to avoid or suppress performance degradation in the entire system even when network optimization is individually performed. Hereinafter, a schematic architecture of the present invention will be described.

Figure 1:
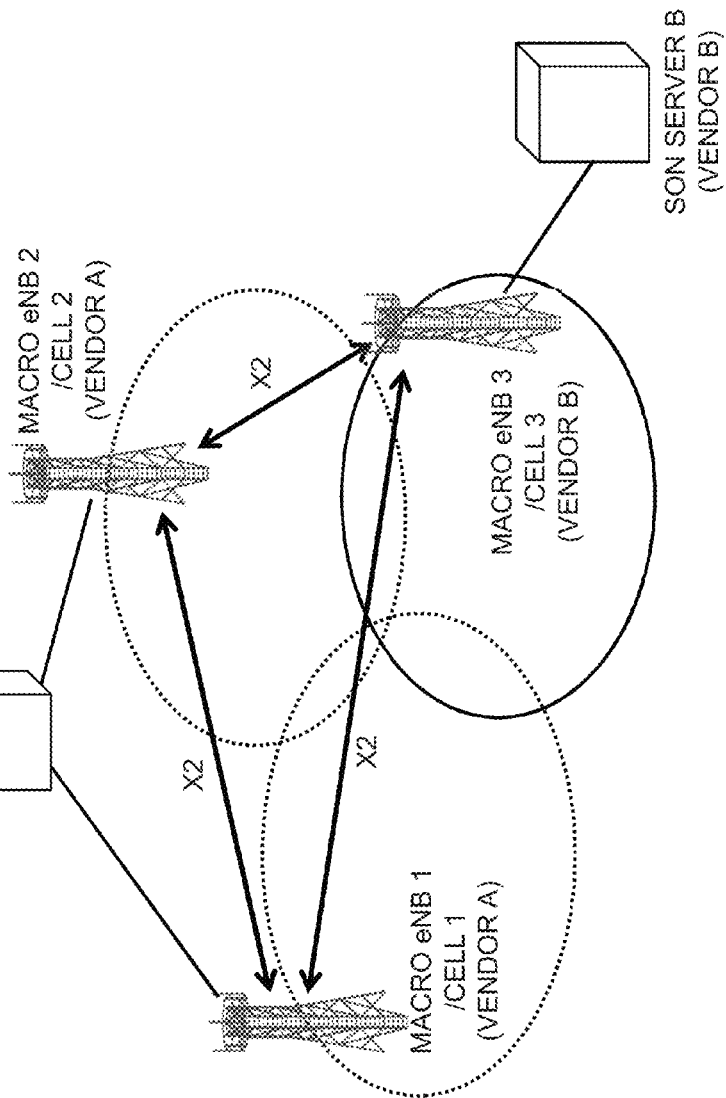
FIG. 1 is a system architecture diagram showing an example of an existing radio communication system.
Figure 2:
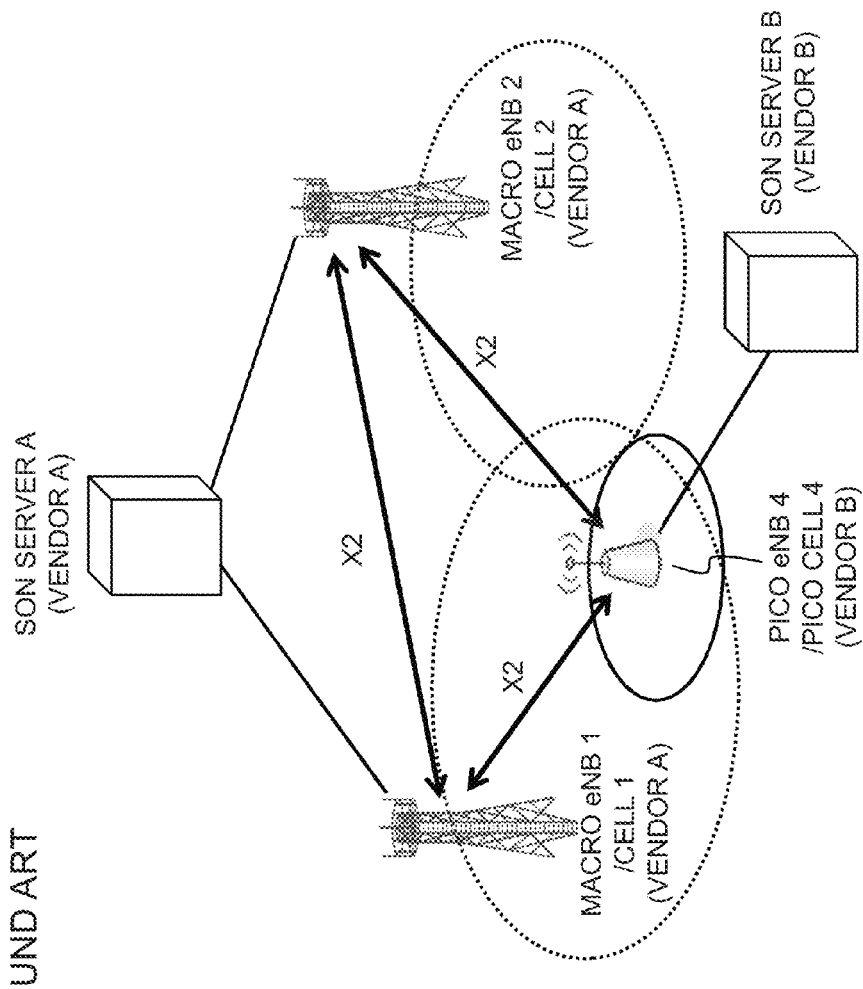
FIG. 2 is a system architecture diagram showing another example of an existing radio communication system.
Figure 3:
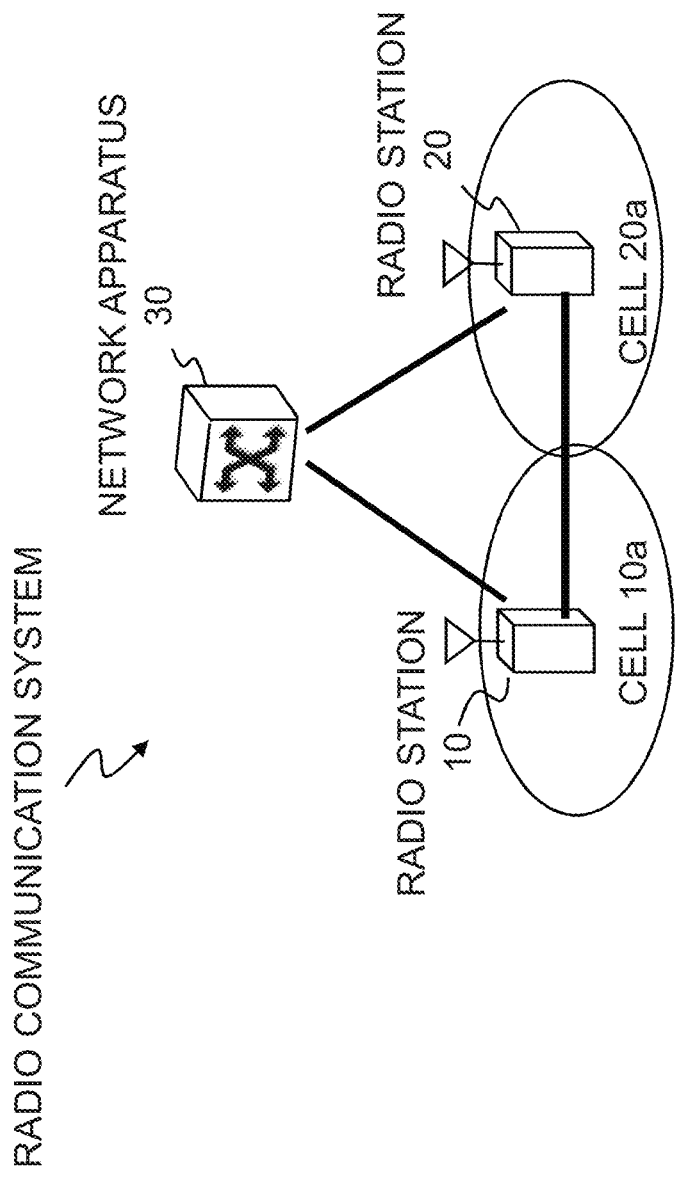
FIG. 3 is a system architecture diagram for describing an outline of a radio communication system according to the present invention.

As illustrated in FIG. 3, a radio communication system is assumed to include radio stations 10 and 20, which manage cells 10a and 20a, respectively, and a network apparatus 30, which controls or manages the radio station 10 and/or the radio station 20. It is not necessary for the cells 10a and 20a to be in contact with each other at the edges, but it is sufficient for them to be deployed as closely as they exert effects on each other.

The radio stations in FIG. 3 may include not only a radio base station directly controlling one or more cells, but also an upper-level station controlling or managing multiple radio base stations (and hence multiples cells). It is conceivable that a radio station is, for example, a radio base station, a base station control station, a network operation management apparatus, or the like. It is conceivable that a network apparatus is a base station control station, a core network apparatus, a network operation management apparatus or the like. The radio station 10 and the radio station 20 may be directly connected through an interface, or may be connected in such a manner that they can communicate with each other via the network apparatus 30. Each radio station (10, 20) has a configuration as shown in FIG. 4.

Figure 4:
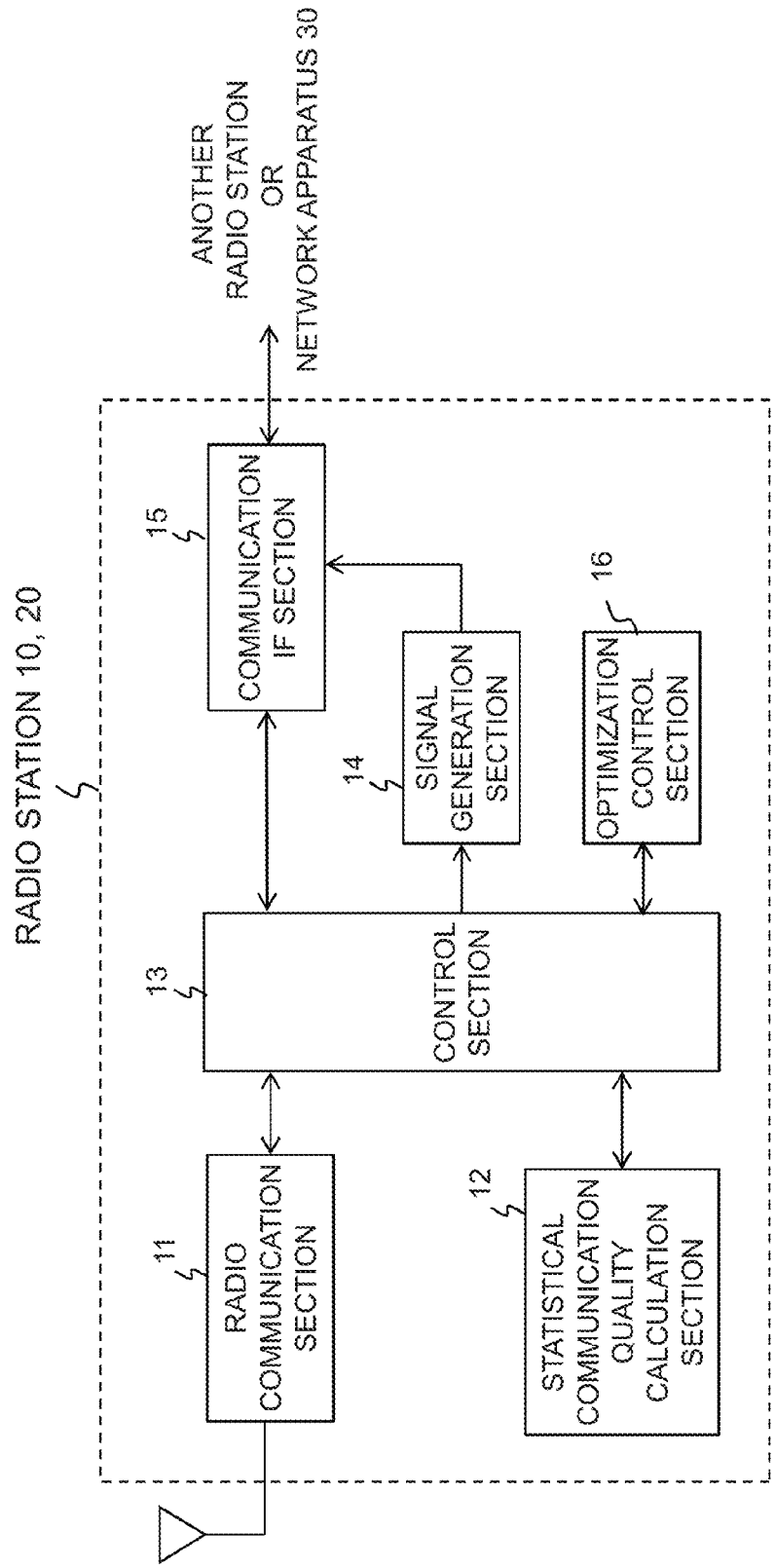
FIG. 4 is a block diagram showing a schematic configuration of a radio station in FIG. 3.

Referring to FIG. 4, the radio station includes a radio communication section 11 for performing radio communication with a radio terminal, a statistical communication quality calculation section 12 that calculates statistical communication quality with respect to communication with a radio terminal and communication with an upper-level station in a cell managed by this radio station, and a control section 13 that controls the operation of this radio station itself and the operation of a radio terminal. The radio communication section 11 and the statistical communication quality calculation section 12 are controlled by the control section 13. Under the control of the control section 13, the statistical communication quality calculation section 12 calculates statistical communication quality in its own cell in accordance with a trigger, which will be described later. Note that the control section 13 may be a program-controlled processor such as a CPU (Central Processing Unit) implementing various functions by means of software. The control section 13 is assumed to have a timer function and a computing function for timing determination.

When a predetermined condition is met such that the control section 13 determines a change in statistical communication quality, a signal generation section 14 generates a notification signal including information related to a change in statistical communication quality and sends it to another radio station or its network apparatus 30 via a communication interface section 15. Alternatively, it is also possible that the signal generation section 14 generates a signal for requesting another radio station or its network apparatus 30 to notify the information related to statistical communication quality and sends it via the communication interface section 15.

Moreover, the control section 13, when receiving from another radio station information related to a change in statistical communication quality in a cell of the another radio station, controls an optimization control section 16, so that autonomous network optimization is performed. Specifically, the optimization control section 16 performs control such as network optimization for the cell its own radio station manages, with consideration given to the received information related to statistical communication quality in the another cell. Here, for the network optimization, conceivable control is, but is not limited to, self optimization of radio parameters and network parameters in a self organizing network (SON), control for restoring the previous state before self optimization is performed when a problem is detected with the consequence of this self optimization, or the like.

In this connection, it is conceivable that the optimization control section 16 (or a similar functional section) may be provided to a upper level network apparatus, not to a radio station. The present invention is also applicable to such a case.

The above-mentioned statistical communication quality is also referred to as KPI (Key Performance Indicator) or network operation quality, for which conceivable ones include, but are not limited to: quality regarding communication between a radio station and a radio terminal under control of the radio station or the statistical value of such quality; network information regarding communication between the radio station and the network apparatus 30 or the statistical value of such network information; statistical information regarding a radio terminal staying in a cell managed by the radio station; and the like.

Note that statistical communication quality (KPI) to be notified by the radio station is determined depending on the following:

It is previously defined in the specifications of a relevant radio communication system;
It is associated beforehand with a type or purpose of network optimization to be performed;
A radio station that notifies statistical communication quality indicates what statistical communication quality is;
A radio station that requests statistical communication quality indicates what statistical communication quality is requested; or the like.

Here, conceivable types of network optimization include, for example: cell coverage optimization; cell capacity optimization; coverage and/or capacity optimization; handover optimization (also referred to as mobility optimization); load balancing optimization; cell outage compensation; energy saving; random access optimization; neighbour cell list optimization; automated configuration of cell ID; inter-cell interference reduction; and the like. Conceivable purposes of network optimization include, for example: handover optimization for a specific neighbour cell; handover optimization for multiple neighbour cells; off-loading to a neighbour cell; off-loading from a neighbour cell; coverage maximization; coverage extension; coverage shrink; dead spot elimination; inter-cell interference coordination; fractional frequency reuse; and the like.

Conceivable examples of statistical communication quality (KPIs) include, but are not limited to: system throughput; user throughput; the number of handovers; the number of successful handovers; handover success rate; the number of handover failures; handover failure rate; the number of call disconnections (the number of RLFs); call disconnection rate (RLF rate); the number of discarded packets; packet discard rate; the number of radio connection requests; the number of radio reestablishment requests; the number of successful random accesses; the number of users failing to meet predetermined received quality; the number of users failing to meet predetermined service quality; transmission delay time; the number of users failing to meet predetermined transmission delay time; the proportion of users failing to meet predetermined transmission delay time; the ratio of areas failing to meet predetermined received quality (also referred to as dead spot ratio); the ratio of areas meeting predetermined received quality; and the like. Note that the calculation of the ratio of areas is effective, for example, when measurement reports including location information can be collected from radio terminals, and the collection of such measurement reports including location information can be achieved by using the Minimization of Drive Test (MDT) technology, which is defined by 3GPP (NPL 3). Moreover, the calculation of a KPI may be performed in each cell with all radio terminals within a cell as targets, or by each radio terminal individually, or may be performed for each service (e.g., for each QoS (Quality of Service)). Further, the calculation of a handover-related KPI may be performed in each cell with all neighbours as targets (i.e., for each cell of interest), or for each cell pair (i.e., each pair of neighbour cells).

Furthermore, it is conceivable that "information related to change in statistical communication quality" includes, for example:

information indicating degradation in statistical communication quality (KPI);

Information indicating change in statistical communication quality (KPI);

information about statistical communication quality (a KPI) that has degraded;

information about statistical communication quality (a KPI) that has changed; and the like.

Here, the "information indicating degradation in statistical communication quality (KPI)" is information indicating whether or not predetermined statistical communication quality (a KPI) has degraded. The "information indicating change in statistical communication quality (KPI)" is information indicating that predetermined statistical communication quality (a KPI) has degraded, has improved, or has not changed (by or greater than a predetermined value or change rate). The "information about statistical communication quality (a KPI) that has degraded" is information indicating the type of statistical communication quality (a KPI) that has degraded, the amount (or rate) of degradation in statistical communication quality (a KPI) that has degraded, or a combination of the value of statistical communication quality (a KPI) and any of them, or information indicating that there is no statistical communication quality (KPI) that has degraded. The "information about statistical communication quality (a KPI) that has changed" is information indicating the type of statistical communication quality (a KPI) that has changed, the amount (or rate) of change in statistical communication quality (a KPI) that has changed, or a combination of the value of statistical communication quality (a KPI) and any of them, or information indicating that there is no statistical communication quality (KPI) that has changed. Further, in addition to any, or any combination, of these, a determination criterion may be notified that indicates based on what criterion a change in statistical communication quality is determined. Specifically, conceivable criteria include, but are not limited to, for example: statistical area information indicating which area (e.g., a cell) statistical communication quality is derived from; statistical interval information indicating at what interval statistical communication quality is checked or calculated; statistical time information indicating at what point of time statistical communication quality is checked or calculated; and the like. Hereinafter, exemplary embodiments and examples of the present invention will be described in detail with reference to drawings.

1. First Exemplary Embodiment

1.1) Sequence

Figure 5:
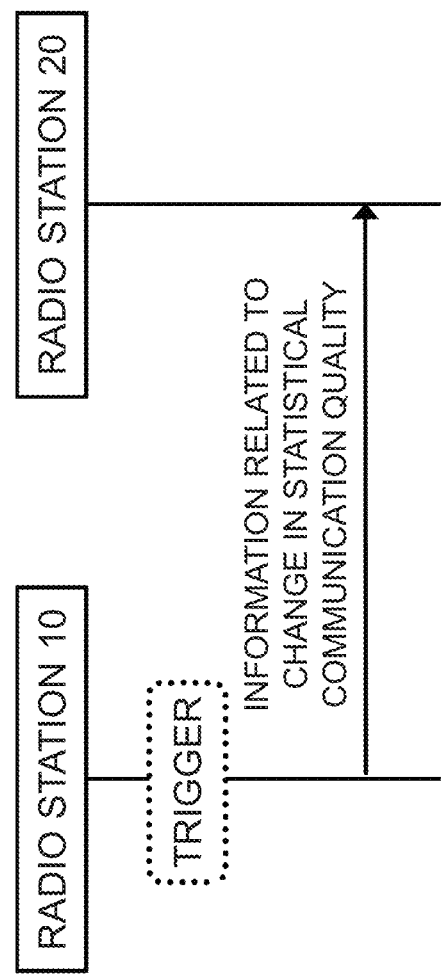
FIG. 5 is a sequence diagram showing operations in a radio communication system according to a first exemplary embodiment of the present invention.

Referring to FIG. 5, a radio station 10 notifies information related to a change in statistical communication quality in a cell under its own management to another radio station 20 that manages a neighbour cell or to a network apparatus 30 that manages such another radio station 20. Thus, the radio station 10 can make the other radio station 20 or network apparatus 30 recognize a change or the like in statistical communication quality in the cell 10a under its own (the radio station 10's) management. For example, the radio station 10 can make the other radio station 20 recognize how control such as network optimization performed in the cell 20a managed by the other radio station 20 affects statistical communication quality in the cell 10a under its own (the radio station 10's) management.

It is conceivable that a trigger which causes a radio station to notify another radio station or its upper level network apparatus of information related to change in statistical communication quality is, for example:

detection of degradation in a statistical communication quality in the cell (its own cell) the radio station manages;

detection of change in a statistical communication quality by a predetermined value or greater (or predetermined ratio or greater) in its own cell;

lapse of a predetermined period of time since the previous notification;

establishment of a new connection with the another radio station;

new addition of a cell managed by the another radio station to a neighbour list; or the like.

Further, notification can be also triggered by a request from another radio station, the calculation of statistical communication quality, a periodic lapse of time, or the like. Accordingly, these may be also included as triggers.

1.2) First Example

Next, operations of a radio station according to a first example of the present invention will be described by taking a case as an example where a trigger for notification is "detection of degradation in statistical communication quality," and information to be notified is "information indicating degradation in statistical communication quality" in the sequence shown in FIG. 5.

Figure 6:
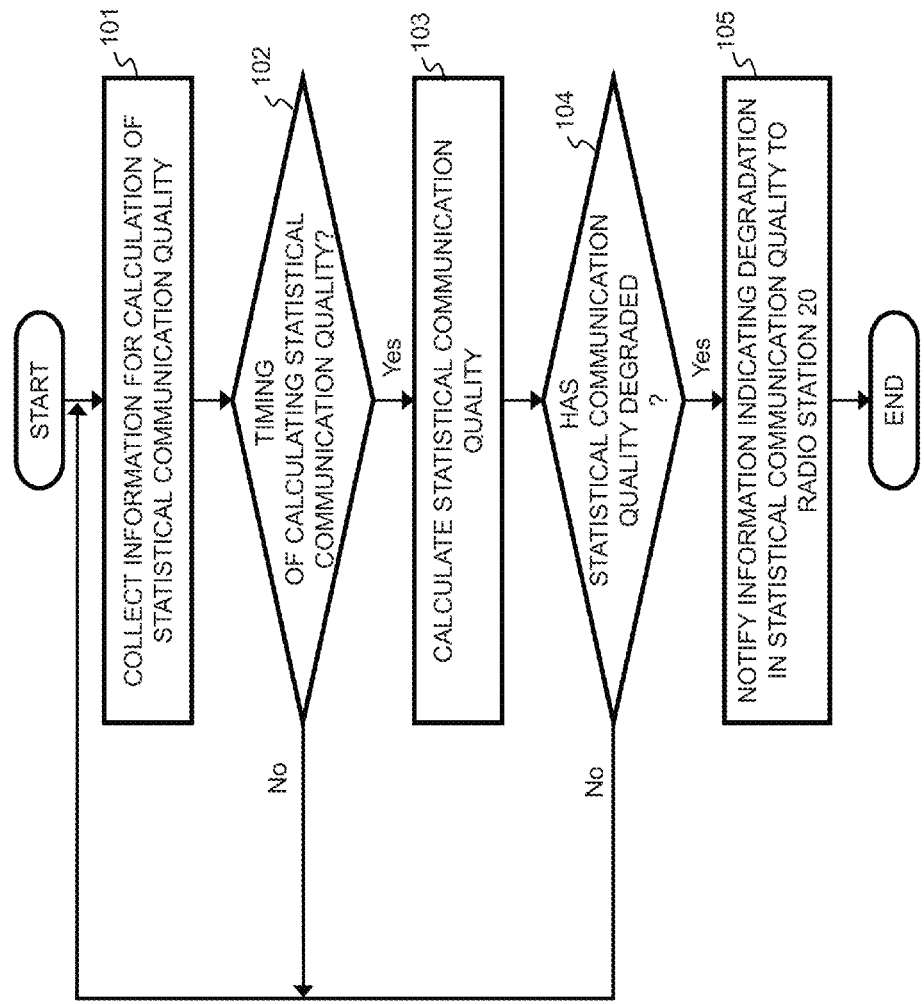
FIG. 6 is a flowchart showing operations of a radio station according to a first example of the present invention.

Referring to FIG. 6, the control section 13 of the radio station 10 collects information for calculation of statistical communication quality from the radio communication section 11 and the communication interface 15 (Operation 101) and determines whether or not it is a timing to calculate statistical communication quality (Operation 102). If it is not a timing to calculate statistical communication quality (Operation 102; No), Operation 101 is repeated. When it is a timing to calculate statistical communication quality (Operation 102; Yes), the statistical communication quality calculation section 12, in accordance with an instruction of the control section 13, calculates statistical communication quality based on the collected information (Operation 103). Subsequently, the control section 13 determines whether or not the calculated statistical communication quality has degraded (Operation 104). For example, degradation in statistical communication quality is determined when the calculated statistical communication quality is lower than a predetermined threshold or is far lower than a predetermined ratio. If the calculated statistical communication quality has not degraded (Operation 104; No), Operations 101 to 103 are repeated without making notification. When it is detected that the calculated statistical communication quality has degraded (Operation 104; Yes), the signal generation section 14, in accordance with an instruction of the control section 13, generates a notification signal including information indicating degradation in statistical communication quality and sends it to the other radio station 20 via the communication interface 15 (Operation 105).

When degradation in statistical communication quality is thus detected by the radio station 10, notification to that effect is made to the other radio station 20 or network apparatus 30, whereby network optimization is performed by the other radio station 20, with consideration given to the effect on the radio station 10. Thus, it is possible to accomplish optimization in the entire system.

2. Second Exemplary Embodiment 2.1) Sequence

Figure 7:
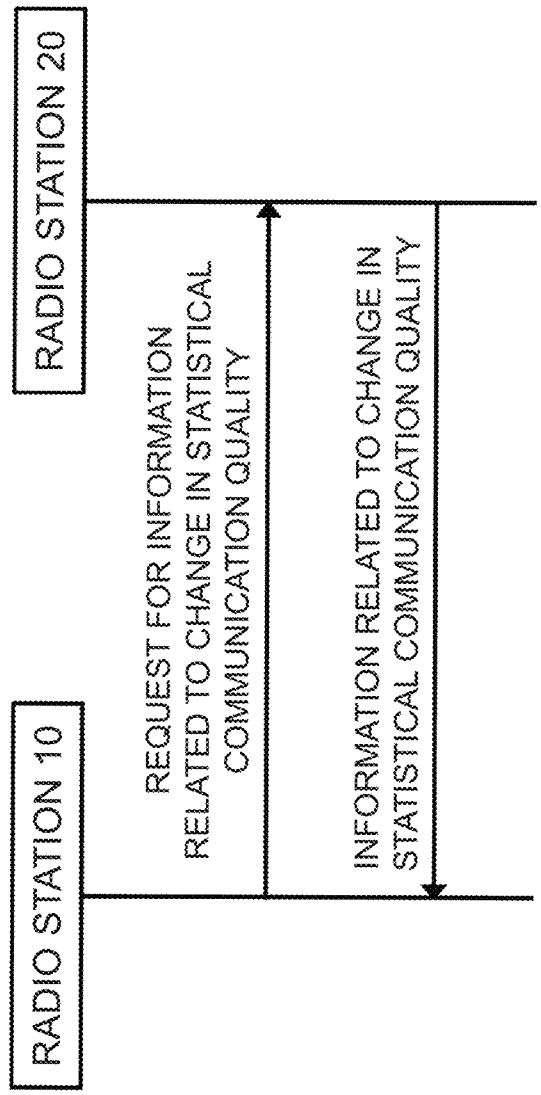
FIG. 7 is a sequence diagram showing operations in a radio communication system according to a second exemplary embodiment of the present invention.

Referring to FIG. 7, a radio station 10 requests another radio station 20 to notify information related to change in statistical communication quality, and the other radio station 20, in response to this request, notifies the radio station 10, which originated the request, of information related to a change in statistical communication quality in its own cell. Thus, for example, the radio station 10 can recognize how control such as network optimization performed in a cell 10a of its own (the radio station 10) affects statistical communication quality or the like in a cell 20a of the other radio station 20.

This request for notification may also include information indicating: statistical communication quality in which cell is requested; statistical communication quality at what point of time is requested; information related to change in statistical communication quality based on what reference point of time is requested; statistical communication quality calculated at what interval is requested; or the like. Specifically, cell identity information, time information, calculation interval information, or the like is notified to the other radio station 20 (or a network apparatus 30).

2.2) Second Example

Next, operations of a radio station according to a second example of the present invention will be described by taking a case as an example where a trigger for notification is "request to notify information related to change in statistical communication quality," and information to be notified is "information indicating change in statistical communication quality" in the sequence shown in FIG. 7.

Figure 8:
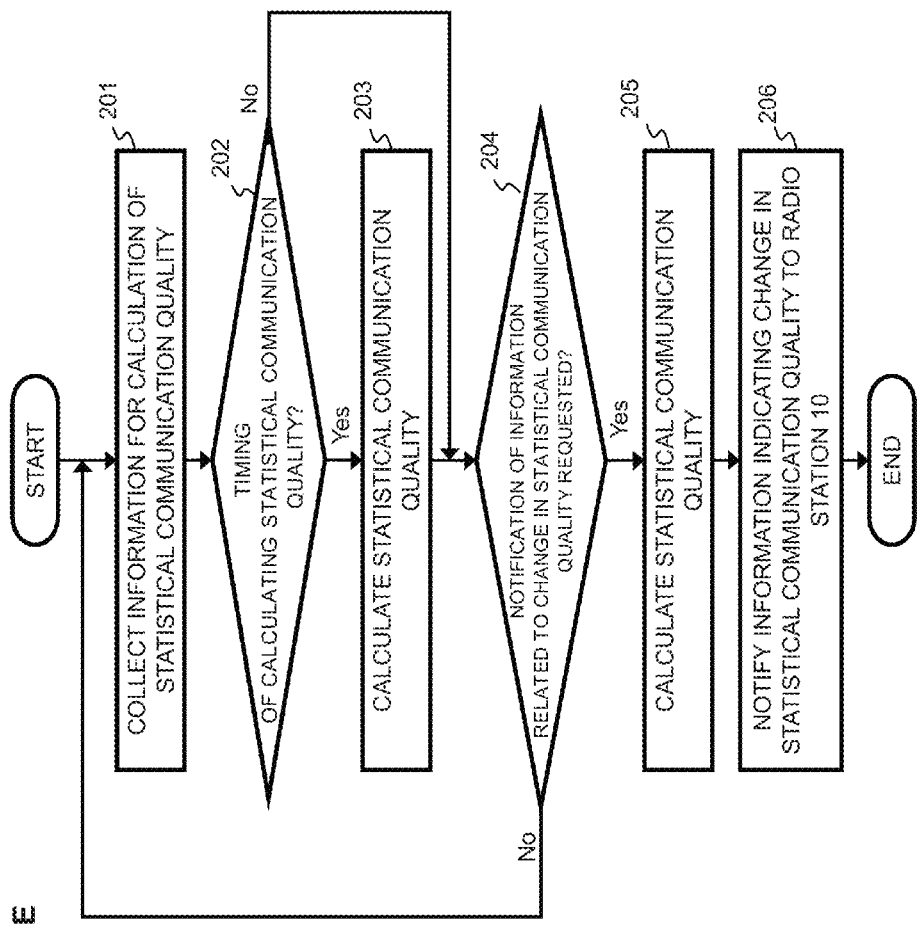
FIG. 8 is a flowchart showing operations of a radio station according to a second example of the present invention.

Referring to FIG. 8, the control section 13 of the radio station 20 collects information for calculation of statistical communication quality from the radio communication section 11 and the communication interface 15 (Operation 201), and determines whether or not it is a timing to calculate statistical communication quality (Operation 202). When it is a timing to calculate statistical communication quality (Operation 202; Yes), the statistical communication quality calculation section 12, in accordance with an instruction of the control section 13, calculates statistical communication quality based on the collected information (Operation 203). When it is not a timing to calculated statistical communication quality (Operation 202; No), the calculation of statistical communication quality (Operation 203) is not performed. Subsequently, the control section 13 determines whether or not a request to notify information related to change in statistical communication quality is received (Operation 204). If no request is received (Operation 204; No), Operations 201 to 203 are repeated. When a request to notify information related to change in statistical communication quality is received (Operation 204; Yes), the statistical communication quality calculation section 12, in accordance with an instruction of the control section 13, calculates statistical communication quality based on collected information (Operation 205). The control section 13 compares the statistical communication quality calculated this time with the latest statistical communication quality and outputs information indicating a change in statistical communication quality to the signal generation section 14, which then generates a notification signal including the information indicating a change in statistical communication quality and sends it to the other radio station 10 via the communication interface 15 (Operation 206).

In this manner, the radio station 20, in response to a request from the radio station 10, notifies a change in statistical communication quality at the radio station 20, whereby the radio station 20 can notify how the cell 20a of its own (the radio station 20) is affected by control such as network optimization performed by the radio station 10. The radio station 10 performs network optimization, with consideration given to this information indicating such an effect, whereby it is possible to accomplish optimization in the entire system.

3. Third Exemplary Embodiment 3.1) Sequence

A sequence according to a third exemplary embodiment is different from that of the second exemplary embodiment shown in FIG. 7 in that a side requesting information specifies a determination condition to a side that notifies the information.

Figure 9:
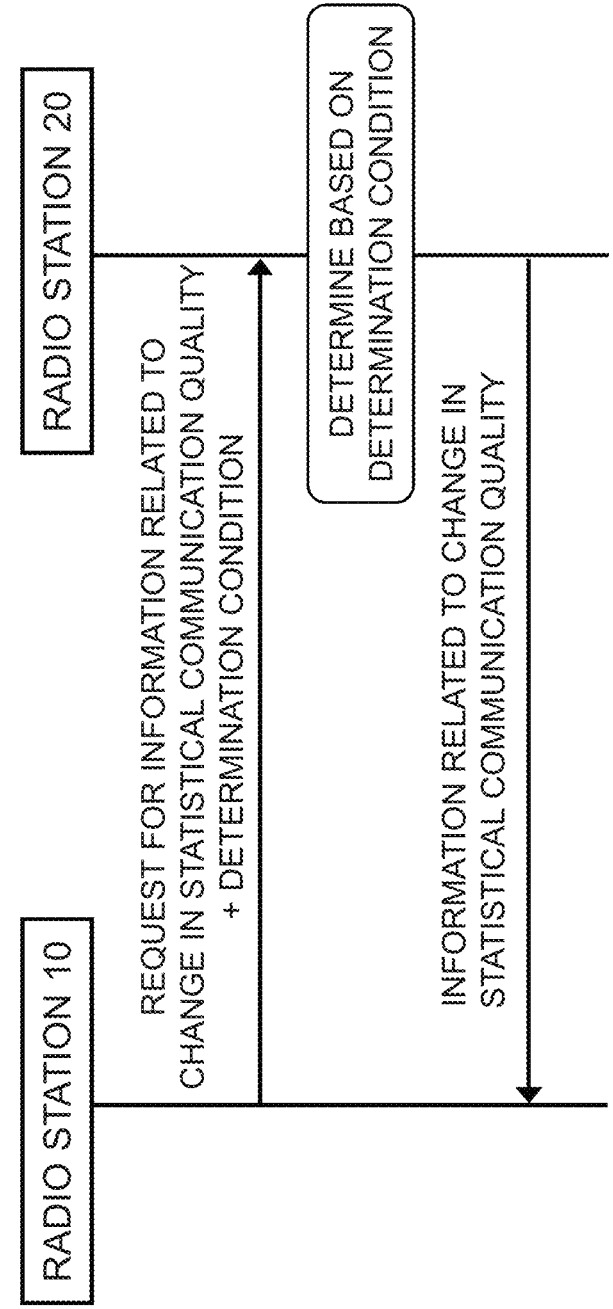
FIG. 9 is a sequence diagram showing operations in a radio communication system according to a third exemplary embodiment of the present invention.

Referring to FIG. 9, when a radio station 10 requests another radio station 20 to notify information related to change in statistical communication quality, the radio station 10 sends a determination condition together. The other radio station 20, in response to this request, notifies the ration station 10, the originator of the request, of information related to a change in statistical communication quality in its own cell, in accordance with the determination condition. Thus, a condition such as information and timing required for network optimization control by the radio station 10 can be designated, whereby the radio station 10 can more accurately find how control such as network optimization performed in its own cell 10a affects statistical communication quality in a cell 20a of the other radio station 20.

This determination condition may also include: statistical area information indicating which area (e.g., a cell) statistical communication quality is to be derived from; statistical time information indicating what point of time statistical communication quality is to be derived at; determination time information indicating what reference point of time is to be based on for the information related to a change in statistical communication quality; statistical interval information indicating what interval statistical communication quality is to be checked or calculated at; or the like. Specifically, cell identity information, time information, calculation interval information, or the like is notified to the other radio station 20. Here, conceivable usages of the determination time information include, for example: designating a predetermined time of day and comparing KPIs at the same times of different dates; comparing KPIs at the same times of different weeks; and the like. Moreover, the statistical interval information may be configured to indicate a predetermined period of time. Conceivable examples include, for example: comparing KPIs during a predetermined period of time (e.g., several hours) starting from the same times (or until the same times, or before and after the same times) of different dates; comparing KPIs during a predetermined period of time starting from the same times of the same days of different weeks; and the like. Further, the above-mentioned predetermined period of time may be statistical interval information.

Furthermore, it is also possible to specify a notification condition to designate a notification mode that indicates whether on-demand notification of information related to change in statistical communication quality is requested, or periodic notification of information related to change in statistical communication quality is requested, or notification of information related to change in statistical communication quality using a trigger-based method, in which notification is made when a predetermined condition is met, is requested, or that indicates any combination of these. As one of methods for implementing these, reporting interval information, reporting trigger information including a predetermined condition, or the like is notified. Here, conceivable predetermined conditions include, for example: a change not smaller than a predetermined threshold (or greater than a predetermined threshold) occurring in statistical communication quality; statistical communication quality becoming not lower than a predetermined value (or becoming higher than a predetermined value); statistical communication quality becoming not higher than a predetermined value (or becoming lower than a predetermined value); and the like.

3.2) Third Example

Next, operations of a radio station according to a third example of the present invention will be described by taking a case as an example where information to be notified is "information indicating the type of statistical communication quality that has degraded and the amount (or rate) of degradation therein," and a determination condition indicated is "a point of time (reference time) based on which a change in statistical communication quality is determined" in the sequence shown in FIG. 9.

Referring to FIG. 10, the control section 13 of the radio station 20 collects information for calculation of statistical communication quality from the radio communication section 11 and the communication interfaces 15 (Operation 301) and determines whether or not it is a timing to calculate statistical communication quality (Operation 302). When it is a timing to calculate statistical communication quality (Operation 302; Yes), the statistical communication quality calculation section 12, in accordance with an instruction of the control section 13, calculates statistical communication quality based on the collected information (Operation 303). If it is not a timing to calculate statistical communication quality (Operation 302; No), the calculation of statistical communication quality (Operation 303) is not performed. Subsequently, the control section 13 determines whether or not a request to notify information related to change in statistical communication quality is received (Operation 304). If no request is received (Operation 304; No), Operations 301 to 303 are repeated.

When a request to notify information related to change in statistical communication quality is received (Operation 304; Yes), the control section 13 determines whether or not a determination condition (a reference time specifying a time based on which a change in statistical communication quality is determined) included in this request for notification is met (Operation 305). When it is not the reference time (Operation 305; No), Operations 301 to 304 are repeated. When it is the reference time (Operation 305; Yes), the control section 13 resets information for calculation of statistical communication quality (Operation 306) and collects anew information for calculating statistical communication quality from the radio communication section 11 and the communication interface 15 (Operation 307). Subsequently, the control section 13 determines whether or not it is a timing to calculate statistical communication quality (Operation 308). When it is a timing to calculate statistical communication quality (Operation 308; Yes), the statistical communication quality calculation section 12, in accordance with an instruction of the control section 13, calculates statistical communication quality based on the collected information (Operation 309). If it is not a timing to calculate statistical communication quality (Operation 308; No), the collection of information for calculation of statistical communication quality (Operation 307) is repeated.

When statistical communication quality is calculated (Operation 309), the control section 13, for example, compares the statistical communication quality calculated this time with the latest statistical communication quality, thereby determining whether or not the statistical communication quality calculated this time has degraded (Operation 310). When degradation in statistical communication quality is detected (Operation 310; Yes), the control section 13 calculates the amount (or rate) of degradation in statistical communication quality (Operation 311) and outputs it to the signal generation section 14. The signal generation section 14 generates a notification signal including information indicating the type of statistical communication quality that has degraded and the amount (rate) of degradation therein and sends it to the other radio station 20 via the communication interface 15 (Operation 312). On the other hand, if no degradation in statistical communication quality is detected (Operation 310; No), a notification signal including information indicating that there is no degradation in statistical communication quality is generated and sent to the other radio station 20 via the communication interface 15 (Operation 312).

In this manner, the radio station 20, in accordance with a request and a determination condition from the radio station 10, notifies information about statistical communication quality that has degraded to the radio station 10, whereby the radio station 20 can notify how the cell 20*a* of its own (the radio station 20) is affected by control such as network optimization performed by the radio station 10. Since information about statistical communication quality that has degraded is notified based on the determination condition indicated by the ratio station 10, the radio station 10 can more accurately find how control such as network optimization performed in its own cell 10*a* affects statistical communication quality in the cell 20*a* of the other radio station 20, and can perform network optimization with consideration given to this information indicating such an effect, whereby it is possible to accomplish optimization in the entire system. Note that similar effects can be also achieved by using information about statistical communication quality that has changed, instead of information about statistical communication quality that has degraded.

3.3) Modification Examples of the Third Example

In the above-described third example, the radio station 10 may further specify to the radio station 20 the interval of calculation of statistical communication quality as a determination condition. For example, a conceivable method is to designate whether statistical communication quality is calculated at short intervals or is calculate at long intervals, or to designate a specific interval. When long intervals are designated, it is necessary to set time information (a reference time) such that this long-interval condition is met based on a timing of making a request.

Moreover, it is also possible that time information (a time when statistical communication quality is calculated) used to specify what time statistical communication quality is calculated is notified instead of time information (a reference time) used for a basis of determination of a change in statistical communication quality, and it is determined whether or not a value calculated this time has changed from a value previously calculated.

4. Application Examples

Hereinafter, a description will be given of application examples in which the above-described exemplary embodiments are applied to a 3GPP LTE system.

Figure 11:
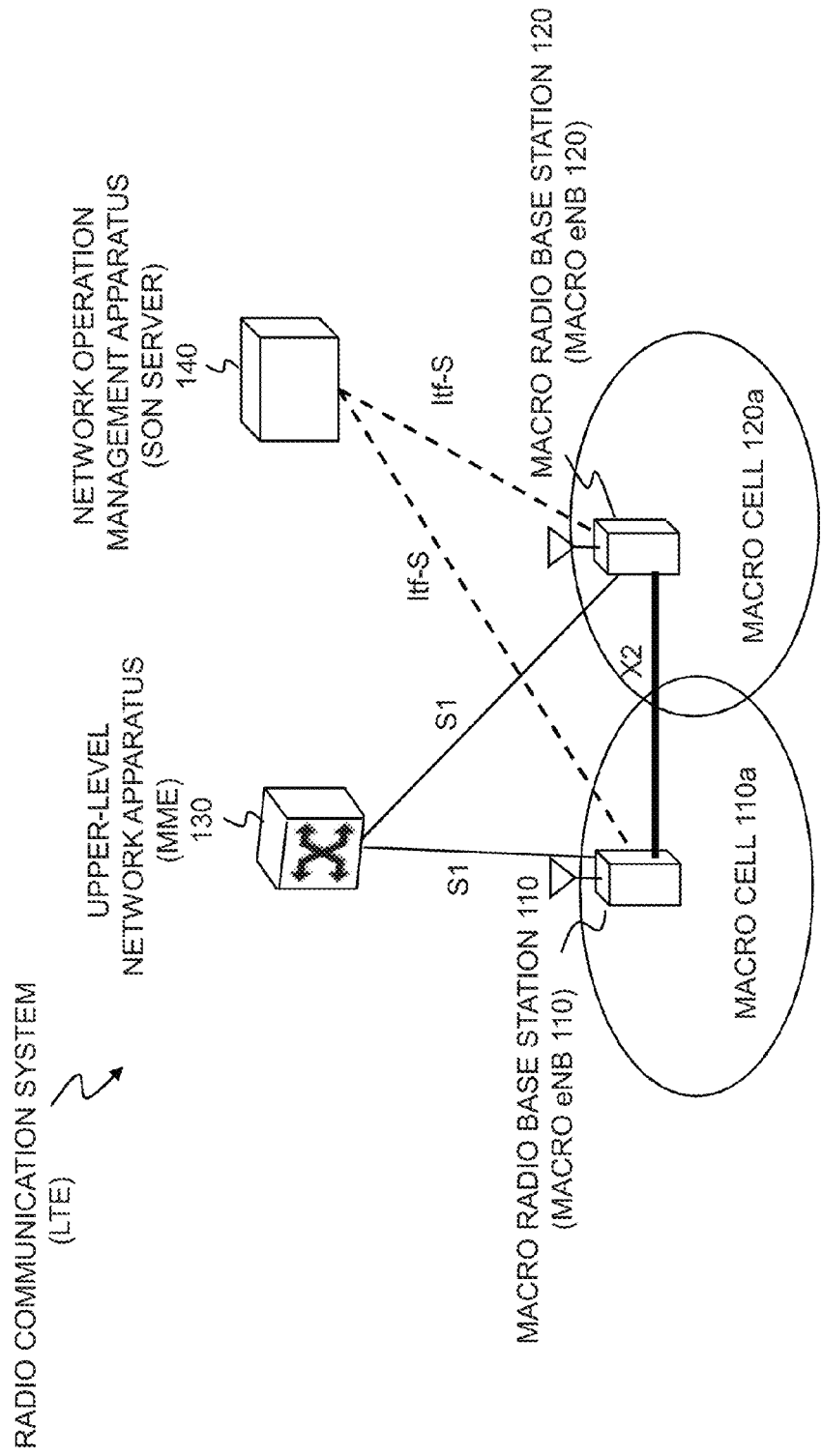
FIG. 11 is a system architecture diagram for describing an outline of a 3GPP LTE system that is an example of the radio communication system according to the present invention.

In an LTE system shown in FIG. 11 and the system shown in FIG. 3, those corresponding to each other are denoted by the same reference numerals. Macro radio base stations (macro eNBs) 110 and 120 are directly connected to each other through an X2 interface. The macro eNBs 110 and 120 are connected to an MME (Mobility Management Entity) as a upper level network apparatus 130 through S1 interfaces, respectively, and further connected to a network operation management apparatus (SON server) 140 through interfaces Itf-S (also referred to as "southbound interface"), respectively.

Although it is assumed in the present exemplary embodiment that information related to change in statistical communication quality and other information to be notified between macro eNBs are sent and received by using the X2 interface of LTE, the S1 interface or an RIM (RAN Information Management) procedure may be used, or alternatively, the interface Itf-S may be used. However, the interface Itf-S produces relatively long delays, and it is therefore very likely that system performance is temporarily degraded, or network loads are increased due to congested information. Accordingly, the X2 interface, which produces shorter control delays than others, is used, whereby it is possible to quickly notify information related to statistical communication quality to another macro eNB and to achieve quick optimization in the entire system.

Here, in the LTE system, conceivable messages to communicate information related to change in statistical communication quality through the X2 interface include, but are not limited to, for example: messages at X2 interface establishment (X2 Setup) (X2 SETUP REQUEST, X2 SERTUP RESPONSE); messages at eNB Configuration Update (ENB CONFIGURAION UPDATE, ENB CONFIGURAION UPDATE ACKNOWLEDGE); messages at Cell Activation of a neighbour eNB (CELL ACTIVATION REQUEST, CELL ACTIVATION RESPONSE); a message at Load Indication (LOAD INFORMATION); messages regarding a mobility settings change (MOBILITY CHANGE REQUEST, MOBILITY CHANGE ACKNOWLEDGE); messages at Resource Status Reporting Initiation/Resource Status Reporting (RESOURCE STATUS REQUEST, RESOURCE STATUS RESPONSE, RESOURCE STATUS UPDATE); and the like. It is needless to say that other messages may be newly defined.

Moreover, statistical communication quality (a KPI) to be notified by an eNB is determined depending on the following, for example:
- It is predefined in the specifications of a relevant radio communication system (e.g., LTE);
- It is associated beforehand with a type or purpose of network optimization to be performed;
- An eNB that notifies statistical communication quality indicates what statistical communication quality is;
- An eNB that requests statistical communication quality indicates what statistical communication quality is requested; or the like.

Here, conceivable types of network optimization include, for example: cell coverage optimization; cell capacity optimization; coverage and/or capacity optimization (Coverage and Capacity Optimization (CCO)); handover optimization (also referred to as mobility optimization) (Mobility Robustness Optimization (MRO)); load balancing optimization (Mobility Load Balancing (MLB)); cell outage compensation (COC); energy saving (Energy Saving Management (ESM)); random access optimization (Random Access Channel Optimization (RAO)); neighbour cell list optimization (Automatic Neighbor Relation (ANR)); cell ID automatic configuration (Automated Configuration of Physical Cell Identity); inter-cell interference mitigation (Inter Cell Interference Reduction); and the like. On the other hand, conceivable purposes of network optimization include, for example: handover optimization for a specific neighbour cell; handover optimization for multiple neighbour cells; off-loading to a neighbour cell; off-loading from a neighbour cell; coverage maximization; coverage extension; coverage reduction; dead spot elimination; Inter Cell Interference Coordination (ICIC); Fractional Frequency Reuse (FFR); and the like.

Further, it is also conceivable that information is exchanged between different Radio Access Technologies (RATs). Accordingly, between UMTS and LTE for example, an interface between an eNB and a RNC or an interface between an LTE core network (Evolved Packet Core (EPC)) and a UMTS core network (Core Network (CN)) may be used. Moreover, it is also possible to define an interface between SON servers of different vendors and use this interface. Note that although the network operation management apparatus 40 is referred to as a SON server as an example, it is also referred to as an O&M (Operation and Management) server. In addition, the configuration of an O&M server is in some cases represented as an EMS (Element Management System) and an NMS (Network Management System) separated. The present invention is applicable to any of these configurations.

Hereinafter, it will be assumed that when simply stating a "radio base station" and a "cell," they indicate a macro eNB and a macro cell, respectively. Moreover, unless otherwise stated, a KPI (Key Performance Indicator) will be assumed to be an example of statistical communication quality.

4.1) Fourth Example

A fourth example of the present invention is an example in which the above-described first exemplary embodiment is applied to an LTE system.

Figure 12:
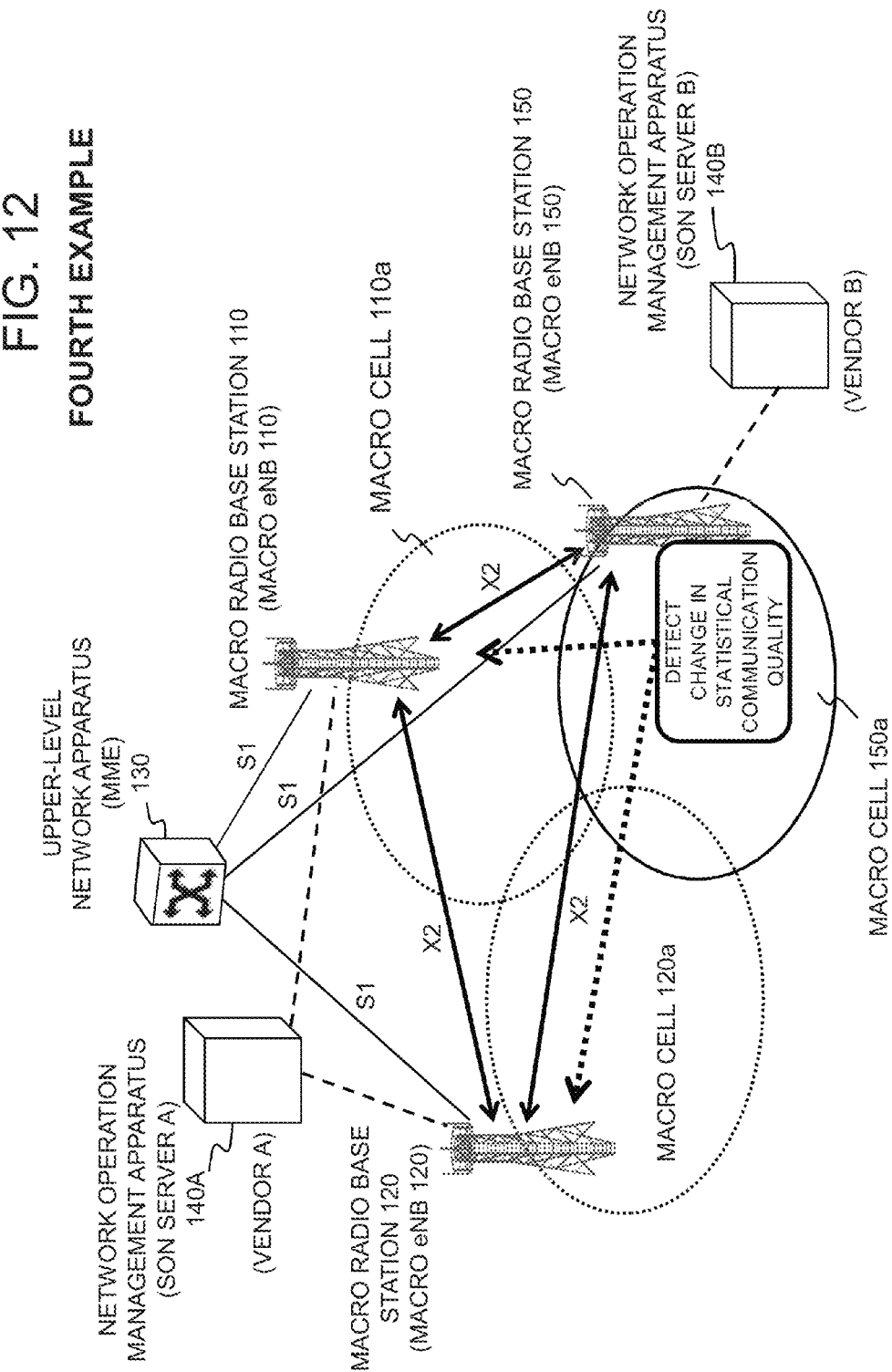
FIG. 12 is a system architecture diagram for describing operations in a radio communication system according to a fourth example of the present invention.

As shown in FIG. 12, it is assumed that a system includes radio base stations 110 and 120, which manage cells 110a and 120a, respectively, and a radio base station 150, which manages a cell 150a, and that the radio base stations 110 and 120 are provided by a vendor A while the radio base station 150 is provided by a vendor B, and further that the radio base stations 110 and 120 are managed by a network operation management apparatus 140A (SON server A) of the vendor A while the radio base station 150 is managed by a network operation management apparatus 140B (SON server B) of the vendor B. In this system, for example, when a change in statistical communication quality is detected in the cell 150a, information about this is notified to the radio base stations 110 and 120 from the radio base station 150 through X2 interfaces. As described above, information related to a change in statistical communication quality may be notified to a upper-level network apparatus 130 from the radio base station 150 through an S1 interface, or may be notified to the network operation management apparatus 140A through an interface Itf-S. Thus, it is possible to have the other radio base stations 110 and 120, or the network operation management apparatus 140A, recognize how control such as network optimization performed in the cells 110a and 120a of the radio base stations 110 and 120 affects statistical communication quality in the cell 150a of the radio base station 150.

In the system shown in FIG. 12, a case will be assumed where the radio base station 110 of the vendor A performs optimization of a handover-related parameter by using the MRO (Mobility Robustness Optimization) function in the cell 110a.

Figure 13:
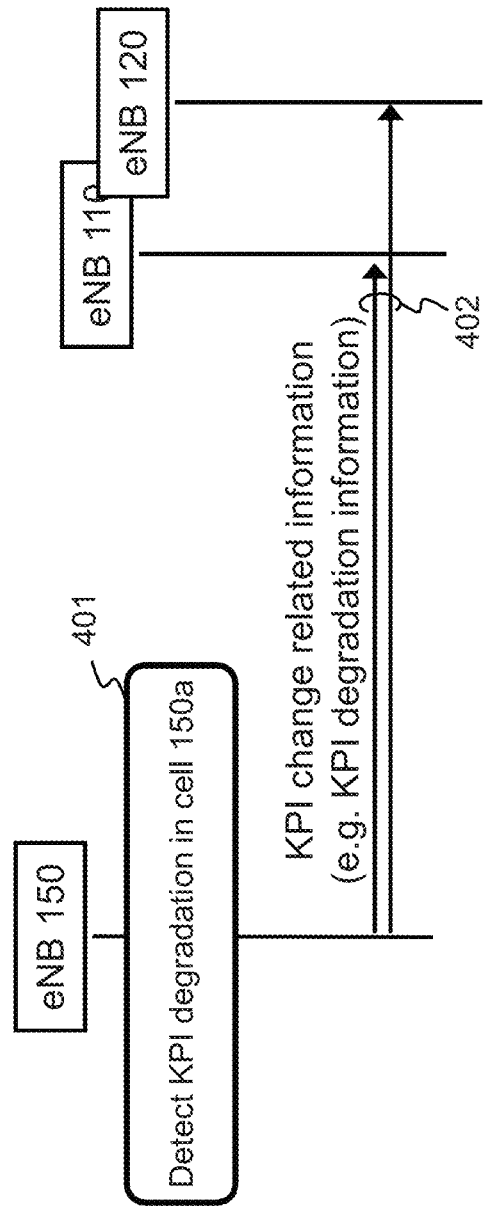
FIG. 13 is a sequence diagram showing operations in the radio communication system according to the fourth example of the present invention.

Referring to FIG. 13, first assume that the radio base station (eNB) 150 of the vendor B or the network operation management apparatus 140B (SON server B) detects KPI degradation in the cell 150a (Operation 401). Triggered by this detection of KPI degradation, the radio base station (eNB) 150 notifies, for example, KPI degradation information as KPI change related information to the radio base stations (eNBs) 110 and 120, which manage the cell 110a and 120a neighbouring on the cell 150a, respectively, or to the upper-level network apparatus (MME) 130 or network operation management apparatus 140A (SON servers A), which manage them (Operation 402).

The radio base stations (eNBs) 110 and 120 or their network operation management apparatus 140A (SON servers A) perform network optimization processing in the cells 110a and 120a, respectively, with consideration given to the notified information indicating KPI degradation. For example, conceivable processing is to undo an update of the handover-related parameter in the cell 110a performed before the information indicating KPI degradation is received; to readjust the handover-related parameter toward the previous state; or the like. Thus, it is possible to suppress KPI degradation in the cell 150a. Here, it is conceivable that handover-related parameters include, for example: a cell individual offset (CIO); an offset to or a threshold of received quality for an event that serves as a trigger of UE measurement report; and the like.

Note that a reference KPI used to determine whether or not the KPI has degraded may be defined beforehand, or may be determined by the radio base station (eNB) 150 that notifies KPI change related information and notified along with the KPI change related information.

Moreover, KPIs may be associated with the types of SON functions. For example, when the MRO or MLB function is (or was) performed, a KPI may be the number of handover failures (the number of HOFs), handover failure rate, the number of handover trials, or the like, which are handover performance related indicators. When the CCO function is (or was) performed, a KPI may be system throughput, user throughput, call disconnection rate (radio link disconnection rate, or also referred to as radio link failure (RLF) rate), the number of RRC connection setup requests, the number of RRC connection setups, the number of RRC connection re-establishment requests, the number of RRC connection re-establishments, or the like, which are coverage or capacity related indicators.

Further, when KPI change related information is notified, a radio base station (eNB) performing this notification may notify its own location information (e.g., GPS (Global Positioning System) measurement information) together. Thus, it is possible to find specifically where a KPI change occurs, and to utilize it in the determination of KPI degradation.

4.2) Modification Example of the Fourth Example

Figure 14:
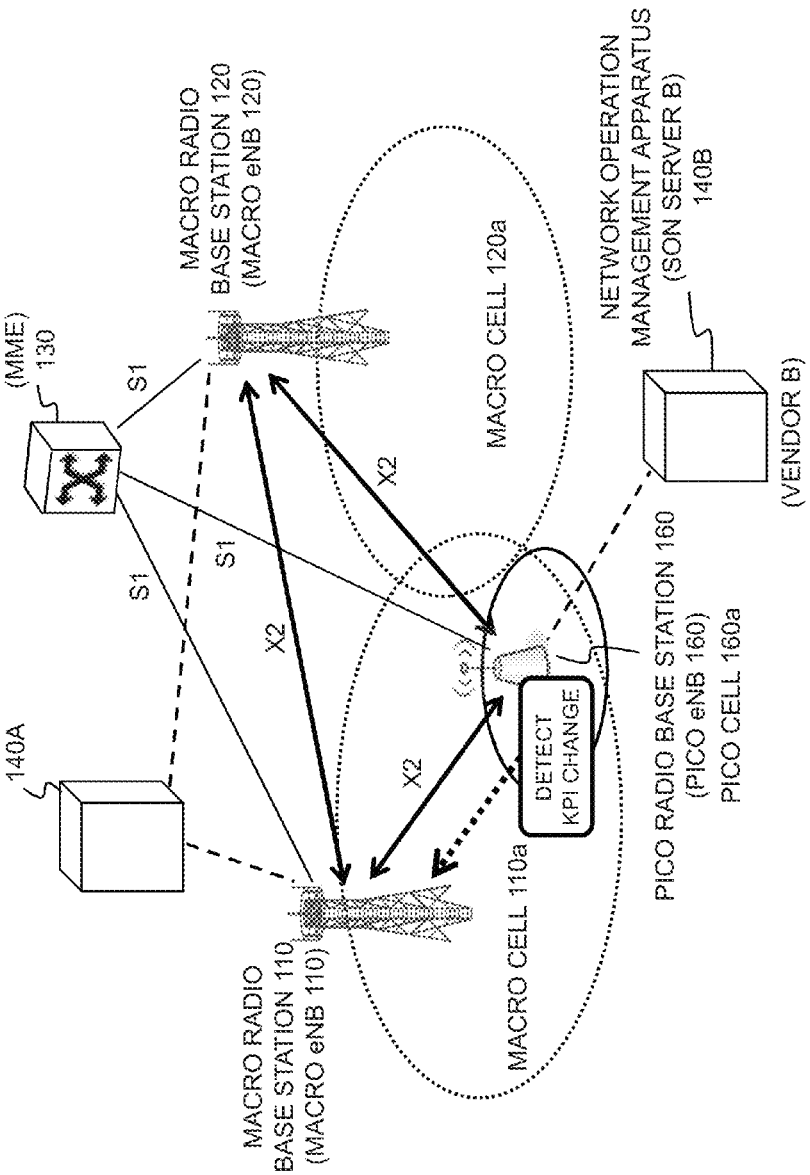
FIG. 14 is a system architecture diagram for describing operations in a radio communication system according to a modification example of the fourth example of the present invention.

As shown in FIG. 14, The present exemplary embodiment can be also similarly applied even if the radio base station 150 and the cell 150a in FIG. 13 are pico radio base station (pico eNB) 160 and a pico cell 160a.

In a heterogeneous network (HetNet) environment as shown in FIG. 14, a case will be assumed where the radio base station 110 of the vendor A performs optimization of the transmit power of the radio base station 110 in the cell 110a by using the CCO (Coverage and Capacity Optimization) function as an example of the SON functions. In this event, when the pico radio base station 160 of the vendor B detects KPI degradation in the pico cell 160a, the pico radio base station 160 notifies KPI change related information (e.g., information about a KPI that has degraded in the pico cell 160a) to the radio base station 110 managing the cell 110a, which is a cell neighbouring on the pico cell 160a, through the X2 interface (or S1 interface). This information may be also notified to the radio base station 120 and other radio base stations managing other neighbour cells.

The radio base station 110 or network operation management apparatus 140A (SON server A) performs network optimization processing in the cell 110a, with consideration given to the notified information indicating KPI degradation. Conceivable processing is, for example, to undo an update of the transmit power in the cell 110a performed before this information indicating KPI degradation is notified, to readjust the transmit power toward the previous state, or the like. Thus, it is possible to suppress KPI degradation in the pico cell 160a.

4.3) Fifth Example

A fifth example of the present invention is an example in which the above-described second exemplary embodiment is applied to an LTE system.

Figure 15:
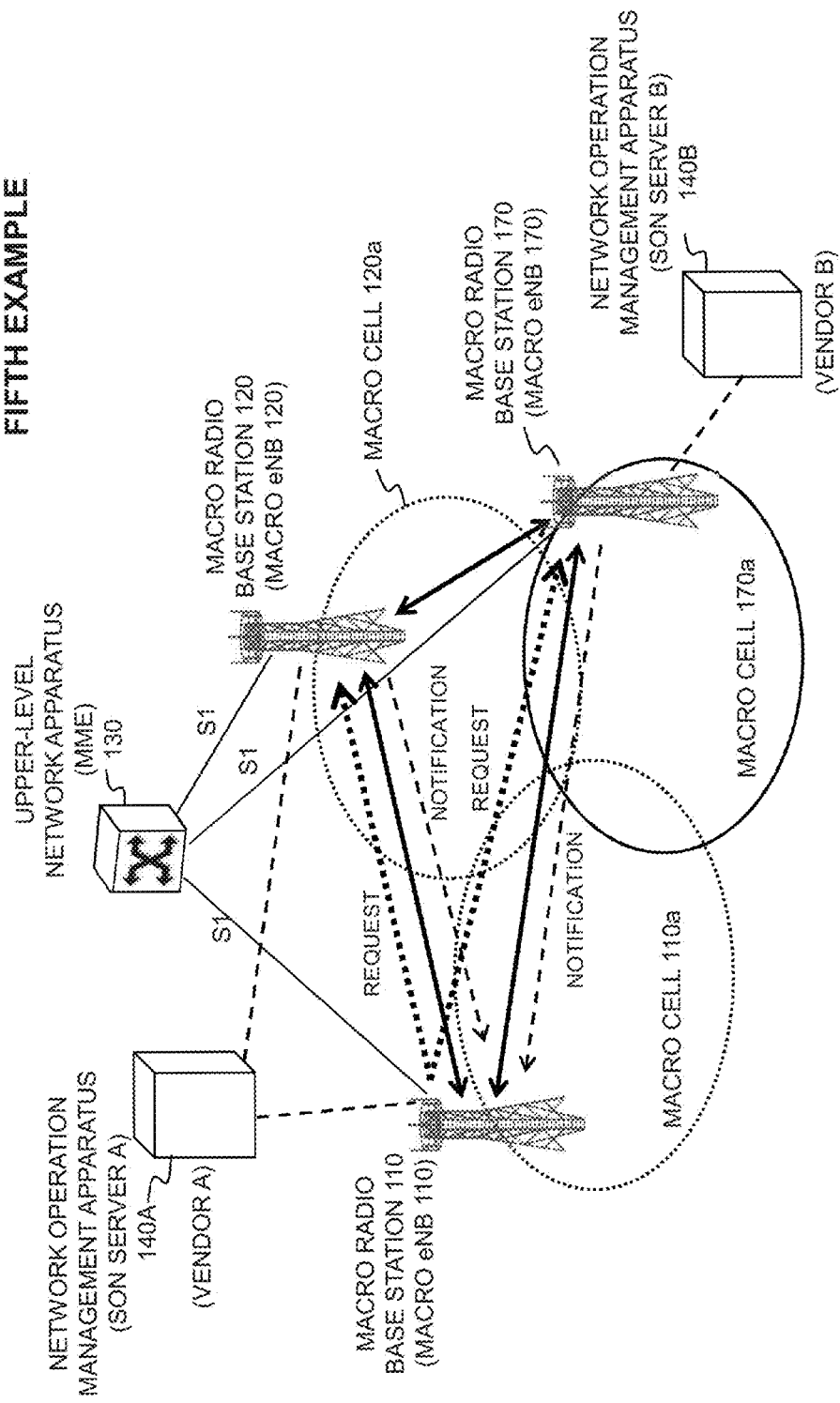
FIG. 15 is a system architecture diagram for describing operations in a radio communication system according to a fifth example of the present invention.

As shown in FIG. 15, it is assumed that a system includes radio base stations 110 and 120, which manage cells 110a and 120a, respectively, and a radio base station 170, which manages a cell 170a, and that the radio base stations 110 and 120 are provided by a vendor A while the radio base station 170 is provided by a vendor B, and further that the radio base stations 110 and 120 are managed by a network operation management apparatus 140A (SON server A) of the vendor A while the radio base station 170 is managed by a network operation management apparatus 140B (SON server B) of the vendor B.

The radio base station 110 requests KPI change related information (e.g., information indicating KPI change) from the radio base station 120 of the vendor A and from the radio base station 170 of the vendor B in order to check how, for example, a change in a handover-related parameter by means of a SON function in its own cell 110a affects the neighbour cells 120a and 170a. If the radio base station 170 or network operation management apparatus 140B (SON server B) of the vendor B detects KPI degradation in the cell 170a, the radio base station 170 notifies the radio base station 110 of information indicating KPI change on the cell 170a. The radio base station 120 notifies the radio base station 110 of similar information. The radio base station 110 or network operation management apparatus 140A (SON server A) performs network optimization processing in the cell 110a, with consideration given to this notified information indicating KPI change. The above-described request and notification are transmitted and received through X2 interfaces (or S1 interfaces).

Note that since the radio base station 120 is managed by the same network operation management apparatus 140A (SON server A) that manages the radio base station 110, the network operation management apparatus 140A (SON server A) can recognize the situation without notification of information indicating KPI change. However, the X2 interface has shorter information transmission interval and shorter delay than the Int-S interface, and it is therefore preferable that the radio base station 120 send information indicating KPI change to the radio base station 110 through the X2 interface.

Thus, the radio base station 110 or network operation management apparatus 140A can recognize how control such as network optimization performed in the cell 110a affects statistical communication quality in the cell 170a of the radio base station 170 and the cell 120a of the radio base station 120.

Figure 16:
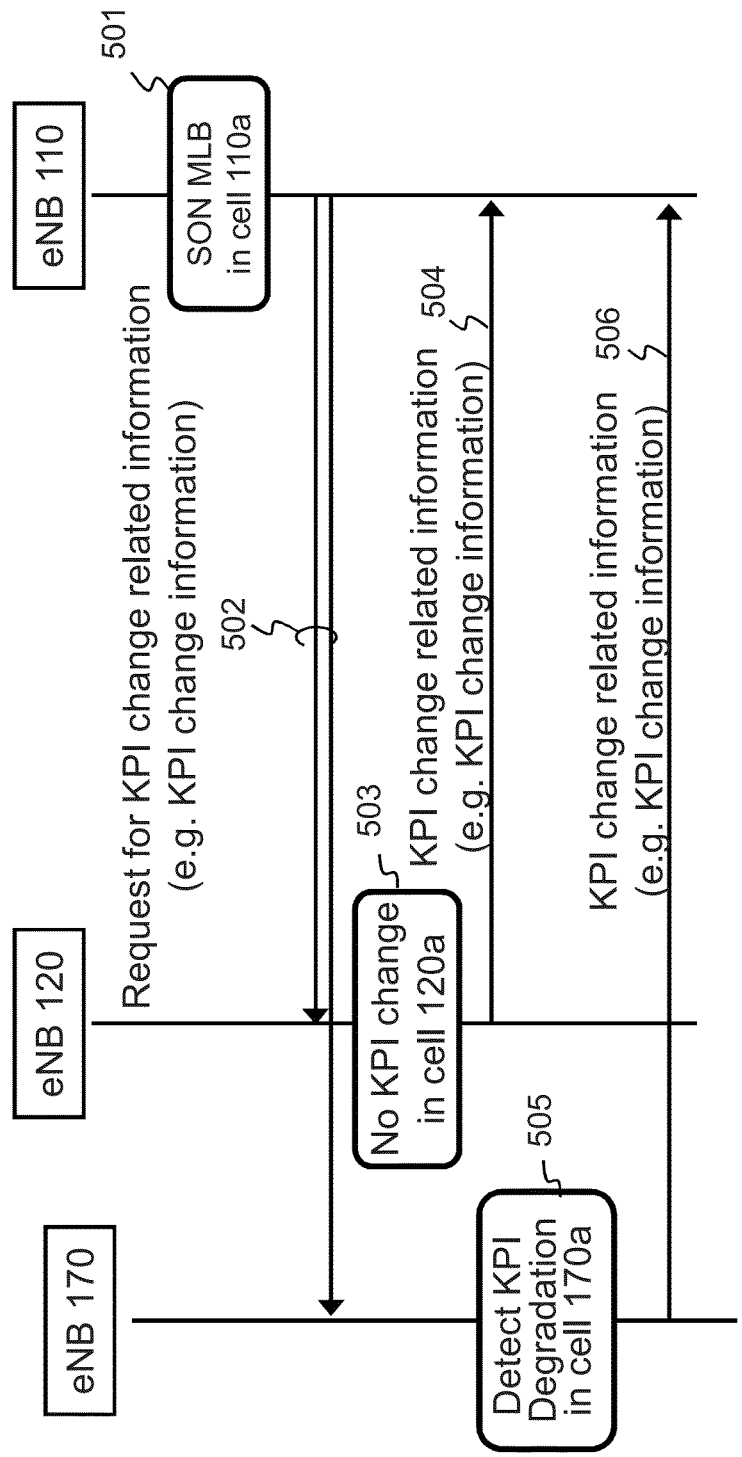
FIG. 16 is a sequence diagram showing operations in the radio communication system according to the fifth example of the present invention.

In a system shown in FIG. 16, it is assumed that the radio base station (eNB) 110 of the vendor A performs optimization of a handover-related parameter (also referred to as a mobility parameter) by using the MLB (Mobility Load Balancing) function in the cell 110a (Operation 501). The radio base station (eNB) 110, upon executing the MLB function, requests the radio base stations (eNBs) 120 and 170 of the neighbour cells to notify KPI change related information (here, KPI change information) (Operation 502; Request for KPI change related information (e.g., KPI change information)). At this time, the radio base station (eNB) 110 may also notify the radio base stations (eNBs) 120 and 170 of information indicating which cells are targets. Conceivable information is, for example, information indicating a KPI in which one of the cells of the radio base station (eNB) 110 (in this example, the cell 110a) is given attention, information indicating which ones of the cells of the radio base stations (eNBs) 120 and 170 are targets (in this example, the cells 120a and 170a), or the like.

The radio base stations (eNBs) 120 and 170 having received this request for notification, each calculate a KPI change. Here, the radio base station (eNB) 120 determines that there is no KPI change in the cell 120a (Operation 503) and notifies KPI change related information (here, KPI change information) (Operation 504; KPI change related information (e.g., KPI change information)). Similarly, the radio base station (eNB) 170 determines that the KPI has degraded in the cell 170a (Operation 505) and notifies KPI change related information (here, KPI change information) (Operation 506; KPI change related information (e.g., KPI change information)).

Thus, the radio base station (eNB) 110 or network operation management apparatus 140A can find how control such as network optimization performed in the cell 110a affects the KPI in the cell 170a of the radio base station (eNB) 170 and the cell 120a of the radio base station (eNB) 120. For example, when the KPI change related information indicates KPI degradation, it is possible to perform processing for undoing an update of the handover-related parameter in the cell 110a performed before such notification is received, for readjusting the handover-related parameter toward the previous state, or the like. Thus, it is possible to suppress KPI degradation in the cell 170a.

4.4) Modification Example of the Fifth Example

When the radio base station 110 requests KPI change related information on the cells 120a and 170a from the other radio base stations 120 and 170 as in the above-described fifth example, the radio base stations 120 and 170 having received the request may be configured to return a response only when the KPI has changed or degraded. In this case, a conceivable method for determining whether or not a change has occurred, or whether or not the KPI has degraded, is a method in which determination is made based on whether or not a change, or degradation, not smaller than a predetermined reference value (or greater than it) has occurred. Alternatively, a method may be employed in which determination is made based on a predetermined change rate or degradation rate, instead of the reference value.

Note that a KPI used for determination, the predetermined reference value, change rate or degradation rate may be defined beforehand, or may be indicated by a side requesting KPI change related information (here, the radio base station 110) to a requested side (here, the radio base station 120, 170). Alternatively, it is also possible that a requested side selects by itself and notifies it by means of a response to the request. Additionally, KPIs may be associated with the types of SON functions, as described in the fourth example.

4.5) Sixth Example

A sixth example of the present invention is an example in which the above-described third exemplary embodiment is applied to an LTE system.

As shown in FIG. 17, in the sixth example of the present invention, a radio base station (eNB) 110 requests KPI change related information from another radio base station (eNB) 120, and it is indicated in this request when determination about a KPI change (i.e., degradation, improvement, or no change) is to be performed (Operation 601; Request for KPI change related information). For example, time information (e.g., an absolute time) serving as a determination reference is notified when the request is made (e.g., Request for KPI change information+time information). This time information may be set to coincide with a SON control execution time in a cell 10a of the radio base station (eNB) 110 (Option (A) or Option (B)).

The other radio base station (eNB) 120, at the indicated time, performs determination about a KPI change in its own cell 120a (Operation 602; Trigger to check KPI degradation in cell 120a) and notifies a result thereof to the requesting radio base station (eNB) 110 (Operation 603; KPI change related information (e.g., KPI change information)).

4.6) Modification Example of the Sixth Example

In a modification example of the sixth example of the present invention, as in the above-described sixth example, the radio base station (eNB) 110 requests KPI change related information from the other radio base station (eNB) 120 and indicates in the request when determination about a KPI change (i.e., degradation, improvement or no change) is to be performed, as shown in FIG. 18 (Operation 701; Request for KPI change related information). This time information is set to coincide with a SON control execution time in the cell 110a of the radio base station (eNB) 110.

The radio base station (eNB) 120 having received the request for KPI change related information checks the KPI at the time it received the request, or performs calculation (if necessary) at this time (Operation 702). SON control is executed in the cell 110a of the radio base station (eNB) 110 (Operation 703). Thereafter, the radio base station (eNB) 120 checks a KPI change at the indicated time, that is, for example, determines which of degradation, improvement, and no change has occurred, compared to the KPI obtained in Operation 702 (Operation 704; Trigger to check KPI degradation in cell 120a), and notifies a result thereof to the requesting radio base station (eNB) 110 (Operation 705; KPI change related information (e.g., KPI change information)).

Note that the requesting radio base station (eNB) 110 may specify at what interval KPI calculation is performed, instead of the time information. For example, when the request is made, interval information to be applied to KPI calculation (e.g., a value of interval, short interval, long interval, or the like) may be notified.

5. Others

A radio station having received notification of information related to a change in statistical communication quality may be also configured to transfer this notification to another radio station that has not registered a cell indicated in this notification in its neighbour cell list, or to another radio station that has registered this cell in its neighbour cell list but has not established direct connection through an interface with a radio station managing this cell.

Further, when notifying information related to a change in statistical communication quality, it is possible to also notify, for example, the location information of a radio station, the degree of interference between neighbour cells, the number of radio terminals (in active state) in a cell, an increase or a decrease in the number of radio terminals in a cell, or the like.

Although each of the above-described examples is described assuming an LTE radio communication system as shown in FIG. 11, the present invention can be also applied to home radio base stations (home eNBs (HeNBs), or also referred to as femto eNBs (FeNBs)) in LTE. In this case, the X2 interface between HeNBs, the S1 interface between an HeNB and an HeNB gateway (HeNB GW), and the like are used in place of the X2 interface between eNBs and the S1 interface between an eNB and a core network (EPC). In addition, it is also possible to utilize an RIM (RAN Information Management) process.

Further, the present invention can be also applied to 3GPP UMTS (Universal Mobile Telecommunications System). In the case of UMTS, the Iub interface between a radio base station (NB) and a radio network controller (RNC), the Iu interface between an RNC and a core network (CN), the Iur interface between RNCs, the Iur-h interface between home radio base stations (HNBs), the Iuh interface between an HNB and an HNB gateway (HNB GW), and the like are used in place of the X2 and S1 interfaces of LTE.

Furthermore, the present invention can be also applied to 3GPP2 CDMA (Code Division Multiple Access) 2000 (e.g., CDMA 1×EV-DO (Evolution Data Only), 1×RTT (Single-Carrier Radio Transmission Technology), HRPD (High Rate Packet Data)) and to GSM (Global System for Mobile communications). In the case of CDMA2000, the S101/S102 interface, which are interfaces between an LTE core network (EPC) and a CDMA 1× core network, may be used, or a direct interface between an LTE eNB and a CDMA BSC (Base Station Controller) may be established and used, in place of the X2 and S1 interfaces of LTE. In the case of GSM, the Iur-g interface is used. Moreover, the present invention can be also applied to WiMAX (Worldwide interoperability for Microwave Access) and the like.

6. Effects

According to the exemplary embodiments and examples of the present invention described above, a radio station notifies information related to statistical communication quality changes in a cell of this radio station to another base station or its upper-level network apparatus. Thereby, the another base station or its upper-level network apparatus can obtain information related to statistical communication quality in this neighbour cell, whereby it is possible to avoid performance degradation in the entire system when network self-optimization is performed individually.

The exemplary embodiments and examples of the present invention can be also implemented in multi-vendor environments. For example, in a multi-vendor environment, a network operation management apparatus (e.g., SON server) or a radio station (e.g. radio base station) of each vendor, when a network optimization (e.g., SON) function is executed in a cell managed by a radio station of its own vendor, can recognize an effect caused on a neighbour cell managed by a radio station of another vendor. Network optimization is performed based on this, whereby it is possible to accomplish optimization in an entire system.

INDUSTRIAL APPLICABILITY

The present invention is applicable to radio communication systems with SON functionality, such as, for example, 3GPP LTE, 3GPP UMTS, 3GPP2 CDMA2000, GSM, and WiMAX systems.

REFERENCE SIGNS LIST 10, 20, 50 Radio station/radio base station
10a, 20a, 50a Cell
11 Radio communication section
12 Statistical communication quality calculation section
13 Control section
14 Signal generation section
15, 16 Communication interface section
17 Optimization control section
30 Upper-level network apparatus
40 Network operation management apparatus (SON server)

The invention claimed is:

1. A radio communication system in which radio stations perform network optimization based on statistical communication quality in at least one cell, wherein a first radio station comprises:
   at least one interface connected with at least one of a second radio station and a network apparatus, wherein the network apparatus manages the second radio station;
   receive, from the second radio station or the network apparatus via the at least one interface, a request for information indicating a change in statistical communication quality in a first cell of the first radio station, wherein the change was caused by execution of network optimization in a second cell of the second radio station; and
   responsive to the request, send to the second radio station or the network apparatus via the at least one interface, the information indicating the change in statistical communication quality in the first cell of the first radio station.

2. The radio communication system according to claim 1, wherein the second radio station or the network apparatus uses the information indicating the change in statistical communication quality for network re-optimization.

3. The radio communication system according to claim 1, wherein the request includes a determination condition used for determination of the change in statistical communication quality, and the at least one processor is further configured to send the information indicating the change in statistical communication quality in accordance with the determination condition, and
   wherein the determination condition includes at least one of a type of statistical communication quality to be sent, statistical area information indicating a target area, statistical time information indicating a time of performing the determination, determination time information indicating a reference time used for the determination of the change, and statistical interval information indicating an interval of calculating or checking statistical communication quality.

4. The radio communication system according to claim 1, wherein the request includes a sending condition indicating a method for sending the information indicating the change in statistical communication quality, and
   wherein the at least one processor is further configured to send the information indicating the change in statistical communication quality in accordance with the sending condition.

5. The radio communication system according to claim 4, wherein the sending condition is at least one of a one-shot, periodic, and a trigger base for sending when a predetermined condition is met.

6. The radio communication system according to claim 1, wherein the information indicating the change in statistical communication quality includes at least one of information indicating a degradation in statistical communication quality, information about statistical communication quality that has degraded, and information about statistical communication quality that has changed.

7. The radio communication system according to claim 6, wherein the information indicating the degradation in statistical communication quality is information about whether or not predetermined statistical communication quality has degraded.

8. The radio communication system according to claim 6, wherein the information indicating the change in statistical communication quality is information including at least one of predetermined statistical communication quality that has degraded, predetermined statistical communication quality that has improved, and predetermined statistical communication quality that has not changed by a predetermined value or higher, or by a predetermined change rate or higher.

9. The radio communication system according to claim 6, wherein the information about statistical communication quality that has degraded includes at least one of a type of statistical communication quality that has degraded, an amount or a rate of degradation in statistical communication quality that has degraded, a value of statistical communication quality, and information indicating that there is no statistical communication quality that has degraded.

10. The radio communication system according to claim 6, wherein the information about statistical communication quality that has changed includes at least one of a type of statistical communication quality that has changed, an amount or a rate of change in statistical communication quality that has changed, a value of statistical communication quality, and information indicating that there is no statistical communication quality that has changed.

11. The radio communication system according to claim 1, wherein the at least one processor is further configured to:
   send location information of the first radio station to the second radio station or the network apparatus.

12. The radio communication system according to claim 1, wherein the at least one processor is further configured to:
   send information including at least one of a degree of interference between neighbor cells, the number of radio terminals in a cell, and an increase or a decrease in the number of radio terminals in a cell.

13. The radio communication system according to claim 1, wherein the statistical communication quality is at least one of predefined statistical communication quality, statistical communication quality associated beforehand with a type or purpose of network optimization, statistical communication quality indicated by the first radio station, and statistical communication quality indicated by the second radio station.

14. A first radio station in a radio communication system in which radio stations perform network optimization based on statistical communication quality in at least one cell, the first radio station comprising:
   at least one interface connected with at least one of a second radio station and a network apparatus the manages the second radio station;
   and at least one processor configured to:
   receive, from the second radio station or the network apparatus via the at least one interface, a request for information indicating a change in statistical communication quality in a first cell of the first radio station, wherein the change was caused by execution of network optimization in a second cell of the second radio station; and
   responsive to the request, send to the second radio station or the network apparatus via the at least one interface the information indicating the change in statistical communication quality.

15. The first radio station according to claim 14, wherein the second radio station or the network apparatus uses the information indicating the change in the statistical communication quality for network re-optimization.

16. The first radio station according to claim 14, wherein the request includes a determination condition used for determination of the change in statistical communication, and the at least one processor is further configured to send the information indicating the change in statistical communication in accordance with the determination condition, and wherein the determination condition includes at least one of a type of statistical communication quality to be sent, statistical area information indicating a target area, statistical time information indicating a time of performing the determination, determination time information indicating a reference time used for the determination of the change, and statistical interval information indicating an interval of calculating or checking statistical communication quality.

17. The first radio station according to claim 15, wherein the request includes a sending condition indicating a method for sending the information indicating the change in statistical communication quality, and wherein the at least one processor is further configured to:
  send the information indicating the change in statistical communication quality in accordance with the sending condition.

18. The first radio station according to claim 17, wherein the sending condition is at least one of a one-shot, periodic, and a trigger base sending when a predetermined condition is met.

19. A second radio station in a radio communication system in which radio stations perform network optimization based on statistical communication quality in at least one cell, the second radio station comprising:
  at least one interface connected with at least one of a first radio station and a network apparatus, wherein the network apparatus manages the second radio station; and
  at least one processor configured to:
  send, to the first radio station via the at least one interface, a request for information indicating a change in statistical communication quality in a first cell of the first radio station, wherein the change was caused by execution of network optimization in a second cell of the second radio station; and
  receive, from the first radio station via the at least one interface, the information indicating the change in statistical communication quality.

20. The second radio station according to claim 19, wherein the
  at least processor is further configured to perform network re-optimization using the information indicating the change in statistical communication quality.

21. The second radio station according to claim 19, wherein the at least one processor is further configured to perform the network optimization before sending the request.

22. The second radio station according to claim 19, wherein the request includes a determination condition used for determination of the change in statistical communication quality, and the determination condition includes at least one of a type of statistical communication quality to be notified, statistical area information indicating a target area, statistical time information indicating a time of performing the determination, determination time information indicating a reference time used for the determination of the change, and statistical interval information indicating an interval of calculating or checking statistical communication quality.

23. The second radio station according to claim 19, wherein the request includes a sending condition indicating a method for sending the information indicating the change in statistical communication quality.

24. The second radio station according to claim 23, wherein the sending condition is at least one of a one-shot, periodic, and a trigger base for sending when a predetermined condition is met.

25. A network operation management apparatus which manages a network including a first radio station that performs network optimization based on statistical communication quality in at least one cell, the network operation management apparatus comprising:
  at least one interface connected with at least one of the first radio station and a second radio station;
  and at least one processor configured to:
  send, to the second radio station via the at least one interface, a request for information indicating a change in statistical communication quality in a second cell of the second radio station, wherein the change was caused by execution of network optimization in a first cell of the first radio station; and
  receive, from the second radio station via the at least one interface, the information indicating the change in statistical communication quality.

26. The network operation management apparatus according to claim 25, wherein the at least one processor is further configured to perform network re-optimization using the information indicating the change in statistical communication quality.

27. The network operation management apparatus according to claim 25, wherein the at least one processor is further configured to perform network optimization before sending the request.

28. A network optimization method in a radio communication system in which radio stations perform network optimization based on statistical communication quality in at least one cell, the method comprising:
  receiving, at a first radio station, from a second radio station or a network apparatus, a request for information indicating a change in statistical communication quality in a first cell of the first radio station, wherein the network apparatus manages the second radio station, wherein the change was caused by execution of network optimization in a second cell of the second radio station; and
  responsive to the request, sending to the second radio station or the network apparatus, the information indicating the change in statistical communication quality.

29. The network optimization method according to claim 28, further comprising:
  performing, at the second radio station or the network apparatus, network re-optimization using the information indicating the change in statistical communication quality.

30. The network optimization method according to claim 28,
  wherein the request includes a determination condition used for determination of the change in statistical communication quality, and the first radio station sends the information indicating the change in statistical communication quality in accordance with the determination condition, and
  wherein the determination condition includes at least one of a type of statistical communication quality to be sent, statistical area information indicating a target area, statistical time information indicating a time of performing the determination, determination time information indicating a reference time used for the determination of the change, and statistical interval information indicating an interval of calculating or checking statistical communication quality.

31. The network optimization method according to claim 28, wherein the request includes a sending condition indicating a method for sending the information indicating the change in statistical communication quality, the method further comprising:

sending, at the first radio station, the information indicating the change in statistical communication quality in accordance with the sending condition.

32. The network optimization method according to claim 31, wherein the sending condition is at least one of a one-shot, periodic, and a trigger base for sending when a predetermined condition is met.

33. A network optimization method for a first radio station in a radio communication system in which radio stations perform network optimization based on statistical communication quality in at least one cell, the method comprising:

receiving, at the first radio station, from a second radio station or an upper-level network apparatus, a request for information indicating a change in statistical communication quality in a first cell of the first radio station, wherein the upper-level network apparatus manages the second radio station, wherein the change was caused by execution of network optimization in a second cell of the second radio station;

responsive to the request, calculating the information indicating a change in statistical communication quality; and sending, to the second radio station or the upper-level network apparatus, the information indicating the change in statistical communication.

34. A network optimization method for a first radio station in a radio communication system in which radio stations perform network optimization based on statistical communication quality in at least one cell, the method comprising:

sending, at the first radio station, to a second radio station, a request for information indicating a change in statistical communication quality in a second cell of the second radio station, wherein the network apparatus manages the first radio station, wherein the change was caused by execution of network optimization in a first cell of the first radio station; and receiving the information indicating a change in statistical communication quality from the second radio station.

\* \* \* \* \*